(12) United States Patent
Gu et al.

(10) Patent No.: US 9,141,787 B2
(45) Date of Patent: Sep. 22, 2015

(54) INTERLOCKED BINARY PROTECTION USING WHITEBOX CRYPTOGRAPHY

(75) Inventors: Yuan Xiang Gu, Ottawa, CA (US); Paul McRae, Ottawa, CA (US); Bogdan Nicolescu, Montreal, CA (US); Valery Levitsky, Nepean, CA (US); Xijian Zhu, Kanata, CA (US); Hongrui Dong, Ottawa, CA (US); Daniel Elie Murdock, Ottawa, CA (US)

(73) Assignee: Irdeto B.V., Hoofddorp (NL)

( * ) Notice: Subject to any disclaimer, the term of this patent is extended or adjusted under 35 U.S.C. 154(b) by 771 days.

(21) Appl. No.: 13/319,561

(22) PCT Filed: May 6, 2010

(86) PCT No.: PCT/CA2010/000666
§ 371 (c)(1),
(2), (4) Date: Apr. 11, 2012

(87) PCT Pub. No.: WO2010/127438
PCT Pub. Date: Nov. 11, 2010

(65) Prior Publication Data
US 2012/0192283 A1      Jul. 26, 2012

Related U.S. Application Data

(60) Provisional application No. 61/175,945, filed on May 6, 2009.

(51) Int. Cl.
G06F 5/00       (2006.01)
G06F 21/54      (2013.01)
G06F 21/14      (2013.01)

(52) U.S. Cl.
CPC .............. *G06F 21/54* (2013.01); *G06F 21/14* (2013.01)

(58) Field of Classification Search
USPC ............ 726/26, 2, 21, 36; 713/150, 163, 181; 380/255, 264, 276
See application file for complete search history.

(56) References Cited

U.S. PATENT DOCUMENTS

| | | |
|---|---|---|
| 7,054,443 B1 | 5/2006 | Jakubowski et al. |
| 2004/0139340 A1 | 7/2004 | Johnson et al. |
| 2006/0031686 A1 | 2/2006 | Atallah et al. |
| 2006/0195703 A1 | 8/2006 | Jakubowski |
| 2008/0208560 A1* | 8/2008 | Johnson et al. ................ 703/22 |
| 2010/0098255 A1* | 4/2010 | Ciet et al. ..................... 380/277 |

FOREIGN PATENT DOCUMENTS

| | | |
|---|---|---|
| JP | H11119182 A | 4/1999 |
| JP | 2002514333 A | 5/2002 |

(Continued)

OTHER PUBLICATIONS

International Search Report mailed Aug. 9, 2010, from PCT/CA2010/000666.

*Primary Examiner* — Jason K. Gee
*Assistant Examiner* — Sharif E Ullah
(74) *Attorney, Agent, or Firm* — Marc S. Kaufman; Amardeep S. Grewal; Reed Smith LLP

(57) ABSTRACT

A system and method for transforming a software application comprising binary code and optionally associated data, from an original form to a more secure form. The method includes performing a combination of binary transmutations to the application, and interlocking the transmutations by generating and placing interdependencies between the transmutations, wherein a transmutation is an irreversible change to the application. Different types of the transmutations are applied at varied granularities of the application. The transmutations are applied to the application code and the implanted code as well. The result is a transformed software application which is semantically equivalent to the original software application but is resistant to static and/or dynamic attacks.

37 Claims, 27 Drawing Sheets

(56) References Cited

FOREIGN PATENT DOCUMENTS

| | | | |
|---|---|---|---|
| JP | 2005018725 A | 1/2005 |
| JP | 2005235076 A | 9/2005 |
| JP | 2007148575 A | 6/2007 |
| JP | 2008059404 A | 3/2008 |
| JP | 2008516502 A | 5/2008 |
| JP | 2008250475 A | 10/2008 |
| WO | 2009044129 A1 | 4/2009 |

* cited by examiner

Key Splitting White Box Key Management

INTERLOCKED BINARY PROTECTION USING WHITEBOX CRYPTOGRAPHY

This application claims priority from U.S. Provisional application 61/175,945 filed May 6, 2009 which is hereby incorporated by reference in its entirety.

FIELD OF THE INVENTION

The present invention relates generally to cryptography and computer security. More particularly, the present invention relates to a method for protecting binary applications from static and dynamic attacks.

BACKGROUND OF THE INVENTION

In the information technology era, more and more applications will be deployed on billions of devices that are widely open for direct attacks. Stopping and preventing attacks have emerged among software designers as a major concern. Today's software is being cracked using increasingly more sophisticated tools, allowing average users to access sensitive information with little or no prior knowledge. Previous security models which assume an output is secure if a protected process operates in a black box (i.e., an attacker can not view the process which operates within the black box) is no longer effective. According to the attack's nature, security vulnerabilities are exploited by attackers, resulting in violation of one or more security properties.

Typically, debug-like activity represents the most common source of attack allowing hackers to understand the overall or detailed operations of an application. Once hackers obtain access to vital data and code, it is only a matter of time to figure out attack-points to focus their further attacks. Subsequently, attackers compromise system security either through the execution of clone programs, through the corruption of program binaries or simply by granting access to sensitive or copyrighted information (copying critical code partially or entirely).

Moreover, modern operating systems contain features that provide a good arsenal for other attacks such as memory lifting attacks. Attackers can take advantage of task management application program interfaces (APIs) offered by an operating system. For instance, the API that suspends processes characteristic to every multiprocessing operating system, allows attackers to access vital information while the process is frozen in memory.

While software security needs to address all these attacks, current security engines ignore many security factors and deliver security engines that concentrate exclusively on specific security concerns while completely ignoring other security threats.

For instance, anti-debug technology detects the presence of a debugger, but cannot protect applications against memory lifting attacks. Cryptography hides critical information, but does not, in and of itself, protect against debugging activity. Another instructive example is the integrity verification that protects applications against tampering attacks, but cannot prevent static or dynamic analysis attacks. As a general paradigm, each security technology addresses one or several attacks, but not the entire range of attacking domains.

It is, therefore, desirable to provide a security system that provides protection against a variety of attack domains. Furthermore, software obfuscation and transformation techniques have been proposed to transform the source code of an application. However, the present invention proposes enhanced security measures which include applying transformations at the binary level, including after the source code has been compiled.

SUMMARY OF THE INVENTION

It is an object of the present invention to obviate or mitigate at least one disadvantage of previous security systems.

One aspect of the invention provides a method of protecting a software application comprising binary code and optionally associated data, from an original form to a more secure form that is resistant to static and/or dynamic attacks attempting to tamper with, reverse engineer, or lift all or part of the application, said system comprising:
 a. providing a build-time toolset to perform binary transmutation preparations to said application and transform the original execution of the said application to a secured execution by using the toolset; and
 b. producing a protected application that is semantically equivalent to the original application, comprising interlocked transmutation executions, which also are interlocked with transmutation preparations, such that the binary protection is no longer separated from the protected application.

In this context the term "semantically equivalent" should be interpreted as "producing the same results or outputs".

A transmutation is a change to the application which comprises more than a simple transformation, in the sense that a transformation typically comprises an operation for which there is an inverse operation to reverse the change made by the transformation, whereas a transmutation represents a more significant change for which there is no simple inverse operation. The transmutation comprises two phases:
transmutation preparation, which applies a series of changes to the application code and implants new code intertwined with changed application code during build-time; and
transmutation execution, which performs the prepared transmutation protection during execution of the protected application including implanted code.

Different types of the transmutations defined in (A) are applied at varied granularities of the application, with the granularities comprising the modules comprising the application, functions comprising a module, the basic blocks of instructions comprising the functions, and the individual machine instructions. The different types of transmutations include: module transmutation, function transmutation, block transmutation, instruction transmutation, integrity verification (IV) transmutation, and anti-debug transmutation. The transmutations incorporate one or more white box transformations.

The protection process is divided into two phases:
(A) a build-time phase, in which the software application is analyzed and transformed statically before execution; and
(B) a run-time phase, in which the transformed software application runs in memory.

One aspect of the invention provides a method of transforming a binary software application comprising binary application code from an original form to a secured form that is resistant to static and/or dynamic attacks attempting to tamper with, reverse engineer, or lift all or part of the application, said method comprising:
 performing a combination of a plurality of binary transmutations to said binary software application during a build time phase by making a series of changes to said binary application code to produce changed binary application code, said changes including implanting new code intertwined with said changed binary application code during build-time; and interlocking said transmutations by generating and placing interdependencies between the transmutations;

applying said combination of transmutations and interlocking to both the binary application code to be protected and the implanted code; and producing a protected application that is semantically equivalent to the original application but which comprises said interlocked transmutations such that the binary protection is no longer separated from the protected application.

Another aspect of the invention provides a method of transforming a binary software application comprising binary application code from an original form to a secured form that is resistant to static and/or dynamic attacks attempting to tamper with, reverse engineer, or lift all or part of the application, said method comprising:

analyzing said binary application to determine at least one component of said application to which at least one binary transmutation can be applied, said component including component code;

performing a series of changes to said component code to produce changed component code, said changes including applying at least one WB transformation to said component code and implanting new code intertwined with said changes to said binary application code;

interlocking said changes by generating and placing interdependencies between said changes; and applying said changes and interlocking to both the binary application code to be protected and the implanted code to produce a transmuted application that is semantically equivalent to the original application but which comprises said interlocked transformations such that the binary protection is no longer separated from the protected application.

Preferably, the secured execution of the said protected application comprises interlocked transmutation executions configured such that only a small portion of binary code is in clear form during any time of its execution.

At build time, the can system interact with the white-box transformation build-time facility to generate and assemble white-box transformation keys and operation code, and transform binary code and relevant important information from an input form to an output form by performing a white-box transformation operation with a white-box transformation build-time key.

At run-time, the system can interact with a white-box transformation run-time facility to transform binary code and relevant important information from an output form back to an input form by performing a white-box transformation inverse operation with a white-box transformation run-time key.

Other aspects and features of the present invention will become apparent to those ordinarily skilled in the art upon review of the following description of specific embodiments of the invention in conjunction with the accompanying Figures.

DETAILED DESCRIPTION

Generally, the present invention provides a system and method for transforming a software application comprising binary code and optionally associated data, from an original form to a more secure form. The method includes performing a combination of binary transmutations to the application, and interlocking the transmutations by generating and placing interdependencies between the transmutations, wherein a transmutation is, in practice, an irreversible change to the application. Indeed, with respect to the level of difficulty involved, the combination of the interlocked transformations produces a transmutation to the application, which in practice, is irreversible, because the interlocking makes it not only difficult to reverse engineer the transformation applied, but simply applying the inverse of the transformation doesn't give you back the original code. To be clear, by irreversible, we do not necessarily mean that the entire process can not be reversed in a metaphysical sense, but rather that practically speaking, reversing the transmutation does not result in recovering the exact original program that was submitted for protection. Different types of the transmutations are applied at varied granularities or layers of the application. The transmutations are applied to the application code and the implanted code as well. The result is a transformed software application which is semantically equivalent to the original software application but is resistant to static and/or dynamic attacks. Note that we use the term "Implanting" to clarify that the process typically involves more than simple inserting of code. We use "implanting" to include making replacements and/or modifications to the original code in order to make the inserted new code workable within the changed application.

Figure 28:
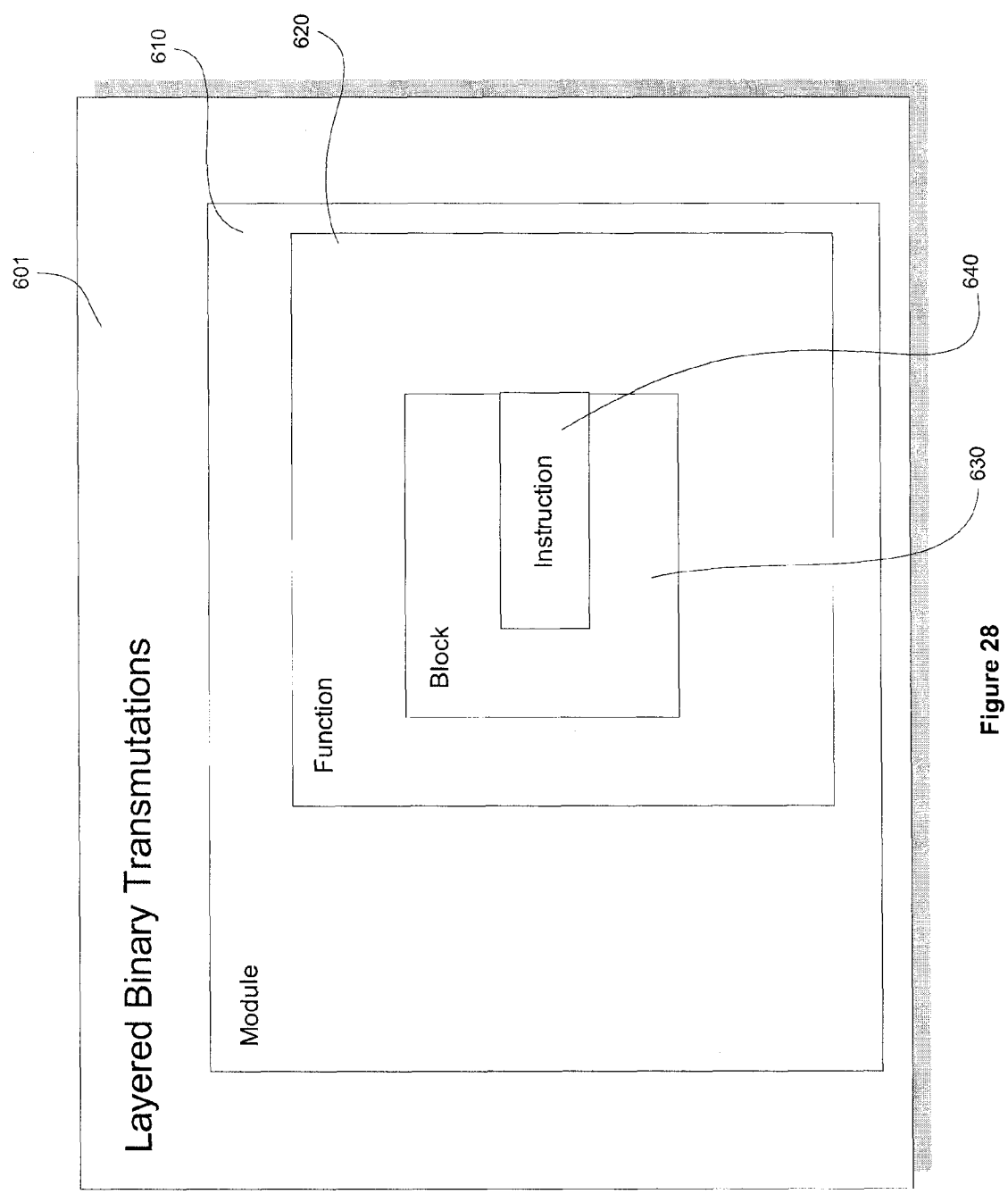
FIG. 28 illustrates these different granularities or components of a program, which form successively nested layers, according to an embodiment of the invention.

As stated, the invention applies a combination of transformations at varied granularities or layers, which are interlocked such that there is no simple reverse transformation. FIG. 28 illustrates these different granularities, which form successively nested layers. Application 601 can include one or more modules 610, which encapsulate one or more functions 620, which encapsulate one or more blocks 630 which can encapsulate one or more instructions 640. Embodiments of the invention apply different transformations to each one of these successively nested layers, and also add interdependencies between them.

Embodiments of the invention join and interconnect various technologies within a post-link binary protection system that mitigates gaps in security architecture. In conjunction with white-box cryptography, embodiments of the present invention enable a defense strategy that comprises combinations of binary transmutations that are applied to the code to be protected. Embodiments of whitebox cryptography are disclosed in commonly owned U.S. Pat. No. 7,397,916 and U.S. patent application Ser. No. 11/020,313 which are incorporated by reference herein in their entirety, as are commonly owned U.S. Pat. Nos. 6,594,761; 6,779,114; and 6,842,862, and U.S. patent application Ser. No. 11/039,817, which are incorporated herein by reference in their entirety.

These transmutations are described as follows:

Anti-debug Transmutation (AD) checks if the protected application is being attached to a debugger.

Block Transmutation (BT) provides binary protection from dynamic code analysis and attacks while protected application is running in memory. Its main role consists of splitting binary applications into white-box transformed blocks, then removing the transform upon request at run-time and subsequently destroying them after execution. Therefore, only the currently executing block of code is exposed.

Function Transmutation (FT) acts as the block transmutation but applies the white box transform to functions which can contain many functional blocks, and removes the transform while invoking the function at run-time and destroys the function after return from the function.

Integrity Verification Transmutation (IV) assures that the in-memory code segment of a protected application or any one of its components has not been tampered with and/or that the disk image of an application component has not been modified.

Module Transmutation (MT) provides binary protection from static code analysis and attacks before the binary code is loaded into memory.

Instruction Transmutation (IT) modifies individual instructions using a white box transformation such that the instruction must have the transform removed before execution. Further, these changes may even include changing the protected instruction itself (for example, inserting entry and exit handlers or by requiring an address manipulated by the instruction to be changed from its original value).

Embodiments allow the choosing of a set of security options, which determine how these transmutations are preferably automatically applied to binary application modules in an interlocked form. By interlock, we mean that we create dependencies within the application, such that two components which are interlocked each require the presence of the other in the final transformed application. For instance, integrity verification calls are inserted at each execution of a block or a function, such that block or function no longer works properly without a successful IV call, and that the IV call is only successful if the block or function has not been tampered with. Furthermore, the security components themselves are protected by other security components (i.e. integrity verification protects the function transmutation engine and block transmutation protects integrity verification).

Except for anti-debug, the transmutations presented above can use white-box transformations to augment security. White-box transformations are distinguished by the fact that the key and transformation algorithm are protected even if the application is exposed to attackers. However, the key is never in its clear form since mathematical transformations are applied to the key that are known only by the transformation code. The white-box technology evoked in this specification is depicted by FIGS. 1 and 2.

Figure 1:
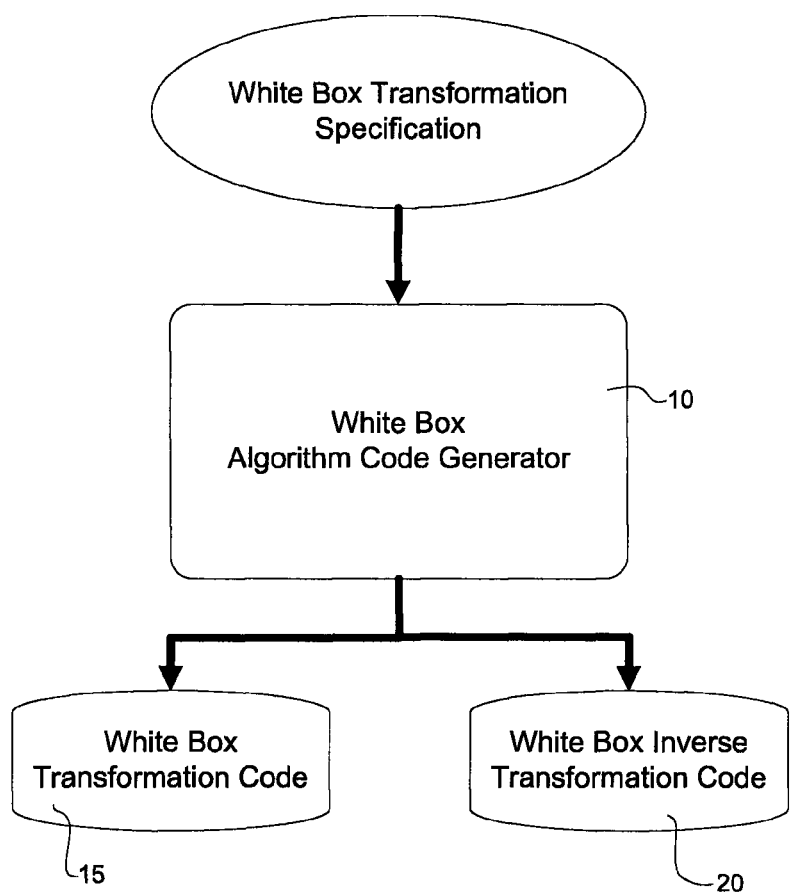
FIG. 1 illustrates white-box (WB) process of automatic WB code generation, according to an exemplary embodiment of the invention.
Figure 2:
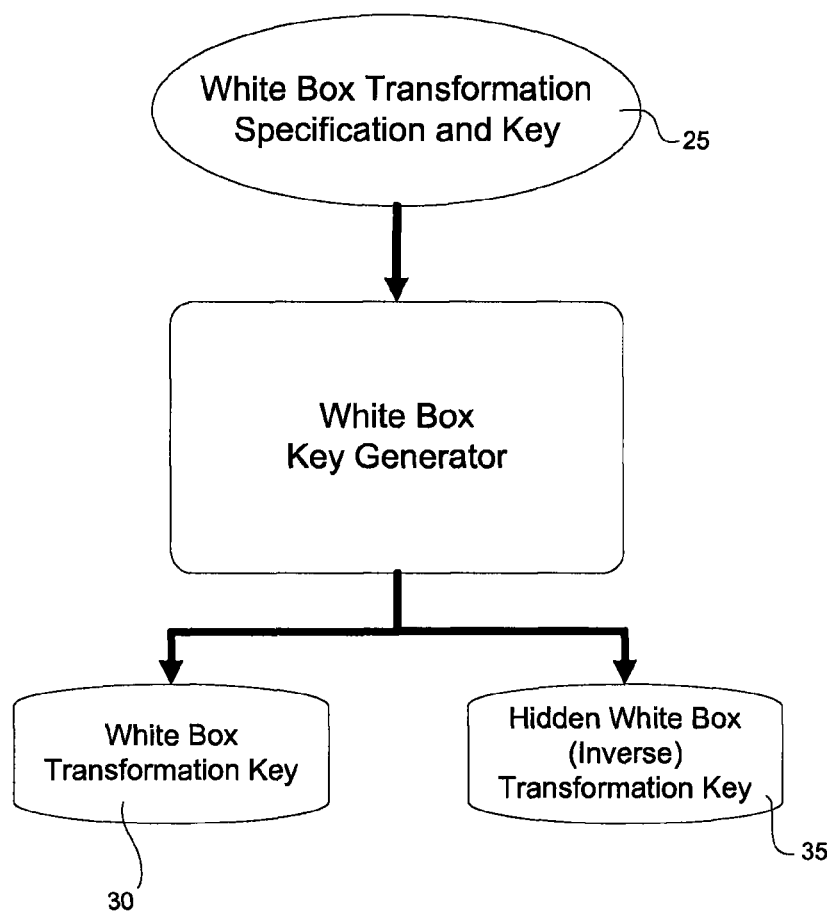
FIG. 2 shows the automatic white-box key generation for transformation and reverse transformation processes, according to an exemplary embodiment of the invention.

FIG. 1 illustrates the automatic code generation 10 for both transformation and reverse transformation processes, while FIG. 2 shows the automatic white-box key generation for transformation 15 and reverse transformation 20 processes. The WB reverse transformation code 20 and hidden key 35 are generated from the same key and transformation algorithm 25. In addition, each hidden WB key 35 relates to an inverse transformation 20 that reverses a transformation by a WB transformation code 15. During the protection phase, users can use a variety of WB keys, allowing each security component to have its own set of white-box keys. For example, integrity verification and module transmutation components can use different keys. In addition, the function transformation component uses a multitude of keys to transform functions. To tune the security-performance trade-off, users have a wide variety of white-box transformation technologies, ranging from complex AES encryption algorithms to simple transformations such as XOR operations. This will be discussed in more detail in the key splitting section below.

Binary Protection System

Figure 3:
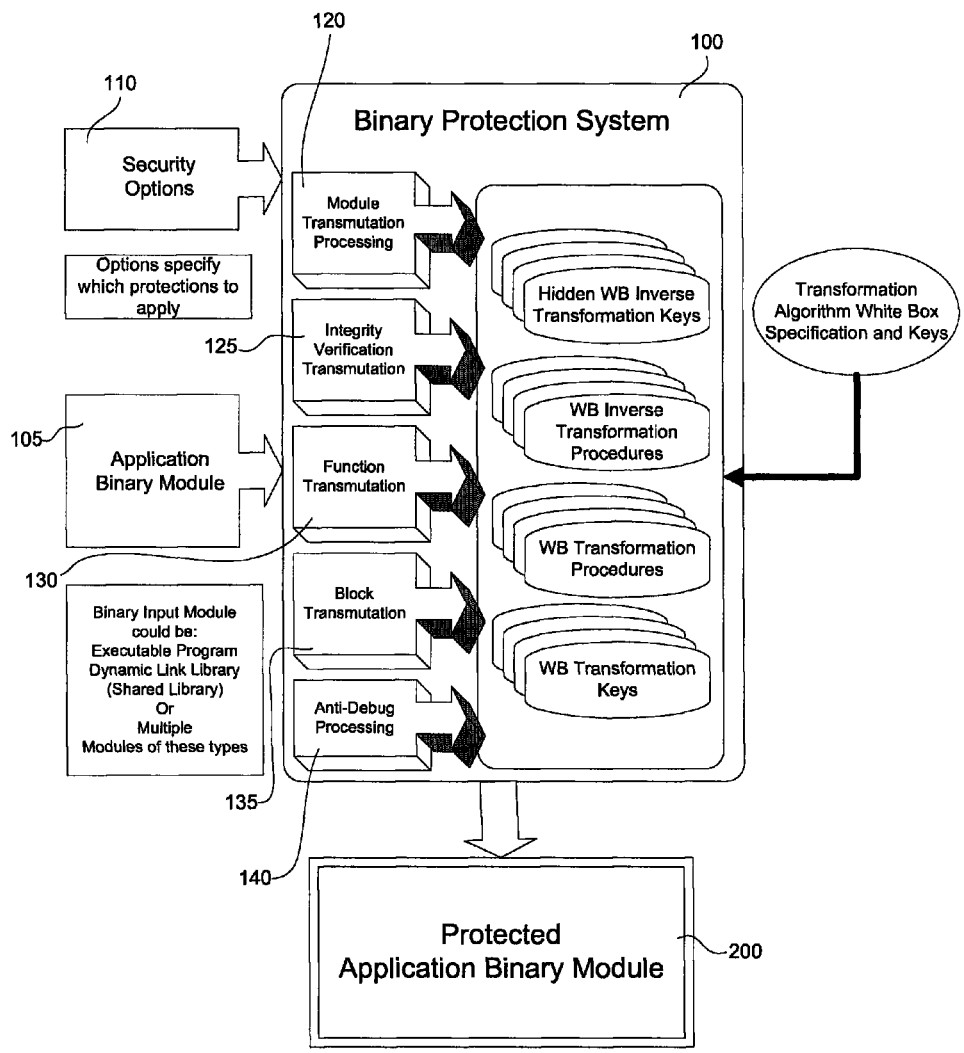
FIG. 3 depicts the proposed binary protection system with its foremost security components, automatically inserted into protected binary applications as interlocked security layers, according to an exemplary embodiment of the invention.

FIG. 3 depicts the proposed binary protection system 100 with its foremost security components, automatically inserted into protected binary applications 105 as interlocked security layers, according to an exemplary embodiment of the invention. Each security layer is implemented by executable code, whether a layer implements IV transmutation 125, FT transmutation 130, BT transmutation 135 or MT transmutation 120. The security layers and the code they protect are both implemented by code that have predecessor/successor relationships allowing for the creation of interlocking relationships among layers. It should be appreciated that FIG. 3 is schematic in nature. MT, FT, BT and instruction transmutations (IT) (not shown) are preferably arranged in successively nested layers (i.e. MT encapsulates FT, which in turn, encapsulates BT, which in turn encapsulates IT, as shown in FIG. 28) in a series of inter-layer transmutations, whereas IV 125 and ADB 140 can be applied on intra-layer basis (i.e, applied to each nested layer, or to a group of layers, or to the whole protected application).

Moreover, security layers execute in a sequence. Each layer, when it gains control, can be set to depend, for its proper execution, on values produced by a preceding layer. For example, MT loads executable code with specific errors that are corrected by FT or BT at execution time. The binary protection tool accepts as input a set of security options 110 that enable and provision the desired security components. Furthermore, users provide transformation keys that are coupled with the security components. In addition, the binary tool allows users to associate a set of transformation keys to a security component. For instance, the Function Transmutation component transforms functions with different keys.

An embodiment provides the ability to interlock with high-level source code protection. For instance, users can apply transformations in the source code in order to increase security. These high-level transformations are automatically applied by the transcoder. Details of the transcoder may be found in commonly owned U.S. Pat. Nos. 6,594,761; 6,779,114; and 6,842,862, and U.S. patent application Ser. No. 11/039,817, which are incorporated herein by reference in their entirety.

Figure 4:
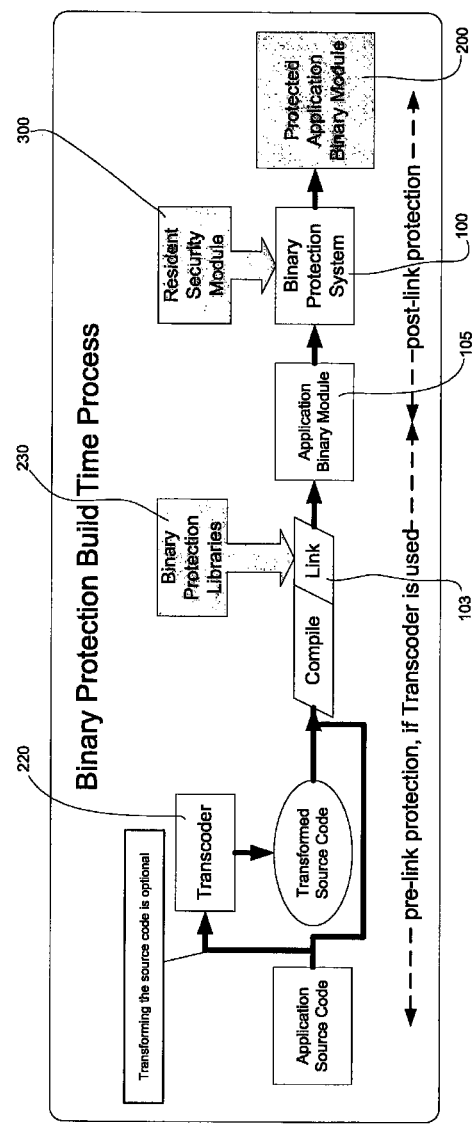
FIG. 4 illustrates a schematic view of the protection process including the usage of a Transcoder as part of a pre-link protection process, according to an exemplary embodiment of the invention.

FIG. 4 illustrates the schematic view of the protection process including the usage of a Transcoder 220 as part of a pre-link protection process, for embodiments in which the source code is also transformed. The Binary Protection System 100 box can be thought of as including the entire block diagram depicted in FIG. 3. In addition, at the source level, users insert some security mechanisms, but the protections they provide are not complete until binary level explicit security engines are inserted as well. For example, in the source code, users employ some security APIs, but the resulting binary, after linkage, is made more secure after the corresponding security component is inserted at the binary level.

Figure 5:
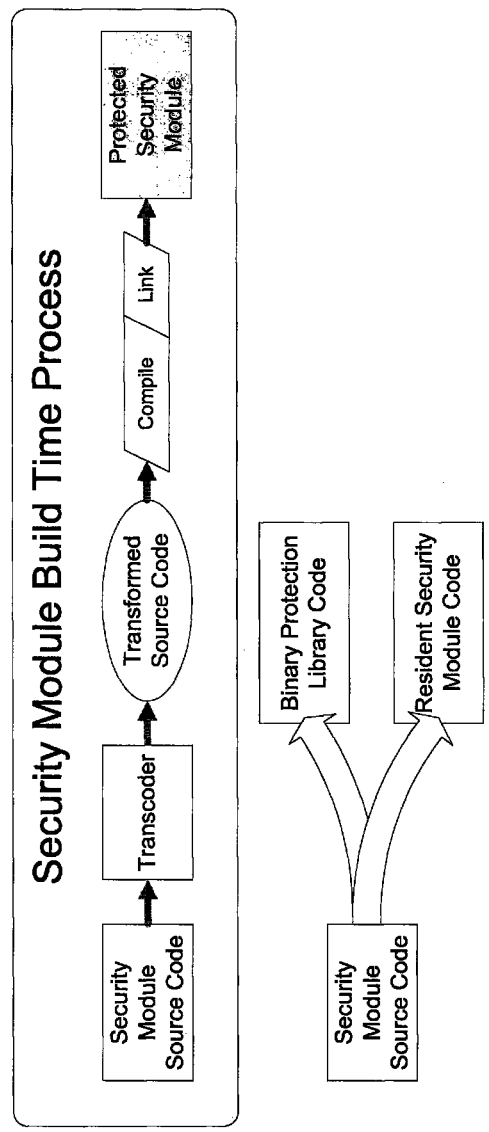
FIG. 5 illustrates how source code transformations can be applied to both the code used by the application to be protected as well as the code comprising the binary protection techniques, according to an exemplary embodiment of the invention.

In FIG. 4 the Binary Protection Libraries 230 represent the interface between users and security components. It is a static library providing a set of APIs to support security requests made by the program. Such APIs provide integrity verification and anti-debug functionality. Another important module in the binary protection process is the Resident Security Module (RSM) 300 that contains the five foremost security component engines. The RSM will be discussed in more detail below. During the post-link protection phase, the Resident Security Module 300 is packaged with the application binary module 200 (known as the payload). The payload module is decomposed into white-box transformed blocks or functions, then compressed and transformed as a whole and packaged with the RSM into a protected application. The new protected application replaces the original executable program and shared libraries in the deployed application. In addition, the Resident Security Module contains the run-time engines of the main security components, the white-box inverse transformation code procedures as well as the transformed keys. The entire post-link protection process is automated. Except when making security options choices, users do not interact with the Resident Security Modules. Both Binary Protection Libraries and Resident Security Module are high-level code protected, and incorporate source code transformations as outlined in FIG. 5. As shown in FIG. 5, the source code transformations can be applied to both the code used by the application to be protected as well as the code comprising the binary protection techniques. That is, both libraries linked in to the application to be protected and the code inserted into the application during the protection phase can have enhanced security by using source code transformations to make attacks difficult.

Figure 6:
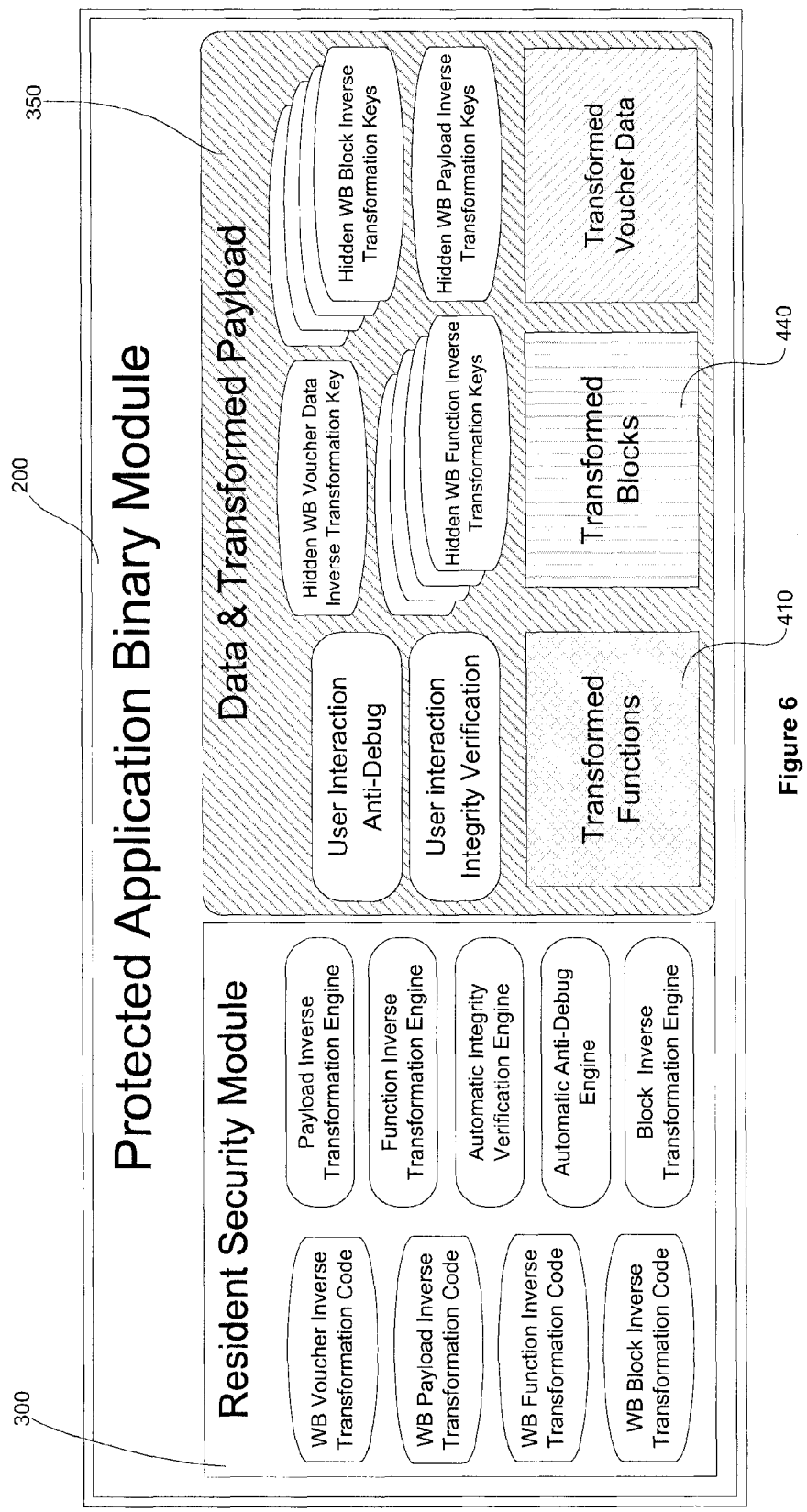
FIG. 6 illustrates the structure of a protected binary application module, after buildtime processing, according to an exemplary embodiment of the invention.

As stated above, the methods and systems described herein generally can be divided into build-time features/components and run-time features/components. FIG. 6 illustrates the structure of a protected binary application module, after buildtime processing, according to an exemplary embodiment of the invention. Fundamentally, the structure of a protected binary application is composed of a Resident Security Module 300 and its transformed payload 350. The Resident Security Module implements static and dynamic protection. It contains security components that do not require the user interaction, such as the white-box reverse transformation routines, the automatic Integrity Verification and Anti-Debug engines, and the Dynamic Block Permutation Manager. In addition, the Resident Security Module is responsible for loading the payload into memory during the run-time phase.). It then stays resident (or portions of it do) so that it can provide services to the various binary transmutations. For example, upon entering an entry handler for function protection, the handler can call into the RSM to get the rest of the function decrypted, and so on.

Build Time Processing

FIG. 6 can best be understood by discussing the process for building such a protected binary application module, namely the build-time process. This section describes the protection phase of each security component and how it is applied individually. The protection flow and the structure of protected binary applications are depicted and analyzed. In addition, this section points out the interaction between security components. Generally, these security components are applied automatically, directly to the binary applications. Security engines of the security components reside in the Resident Security Module 300. There is typically no user interaction demanded to install the security components. The binary application is massively transformed and is included as a payload 350 of the Resident Security Module. Thus the payload, for example, includes the transformed functions 410 (as well as entry and exit handlers (not shown) for each transformed function). According to the desired security technology, applications are modified at the binary level and transformed in several stages. When binary applications are protected with the Module Transmutation, the structure of the payload is not important; the payload is seen as a single entity.

However, the Integrity Verification and Anti-Debug components can have an additional mode that requires user interaction. In this case, functional engines of the security components reside in Binary Protection Libraries 230 that are statically linked into the protected binary application. As an important note, a security component can be applied in both modes. For instance, the Integrity Verification component can be applied at the link phase 103 if users apply the Integrity Verification APIs. Furthermore, the Integrity Verification can be applied again to the resulting binary as a part of post-link protection without any conflict.

Function Transmutation-Build Time

Figure 7:
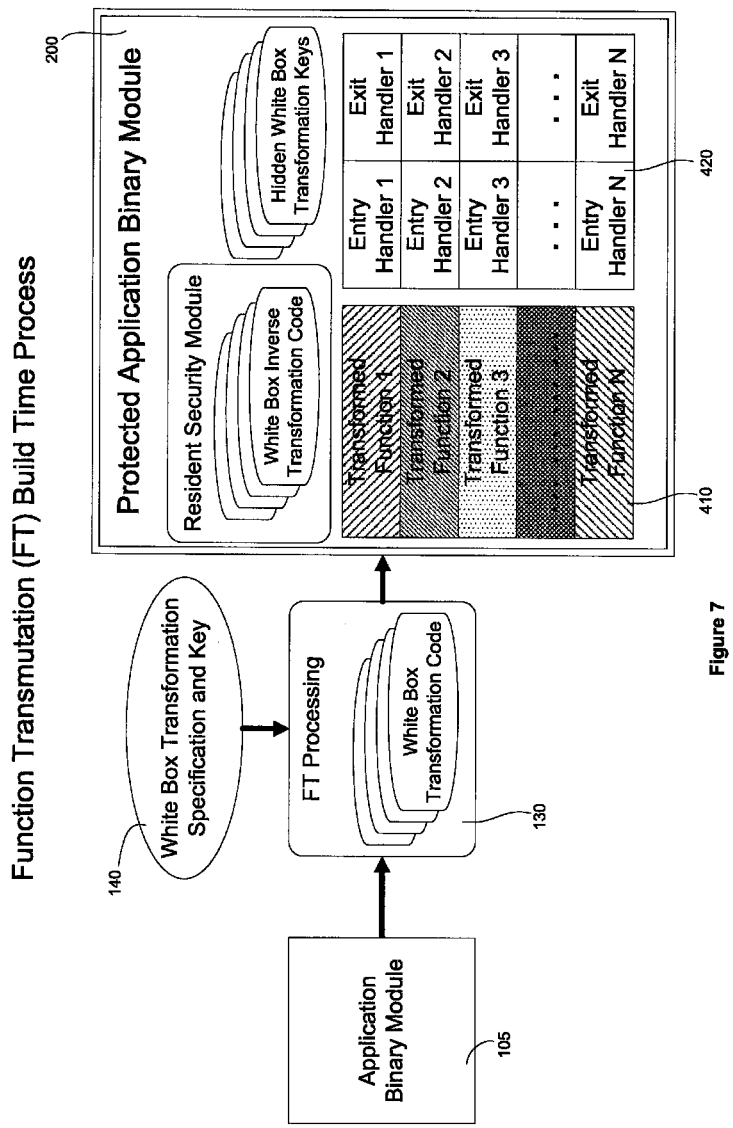
FIG. 7 illustrates the protection flow, where the input is a binary application, according to an exemplary embodiment of the invention.

FIG. 7 illustrates the protection flow, where the input is a binary application, according to an exemplary embodiment of the invention. The Function Transmutation is a post-link protection technology that prevents applications from dynamic attacks. The original binary application 105 is decomposed into its composite functions (e.g., Function 1, Function 2, Function 3 . . . Function N), which are then transformed with WB algorithms by FT processing block 130. The FT processing 130 is executed by a white-box transformation build-time facility 140, which generates and assembles white-box transformation keys and operation code for each function. Each transformed function 410 is then included as the payload of the Resident Security Module. The FT processing also installs Entry and Exit handlers 420 for each function. Each function is transformed with its own white-box key (and its own transformation code), and therefore, the resulting protected binary module contains a hidden WB reverse transformation key (transformation code) for each function. At this point, to avoid any confusion between the terms key and code, we clarify that code refers to the algorithm/software code used to perform a transformation, which typically uses a unique key.

A benefit of the Function Transmutation component is to limit the number of functions that are in clear form at any given moment during execution. In addition, the Resident Security Module intercepts calls to transformed functions 410, and co-operates with the Entry and Exit handlers 420 for each function. Entry handlers are responsible with reversing the WB transformation on the function and responsible for white-box key management, while Exit handlers destroy the functions in memory. Thus, calls to functions are performed via Entry handlers while returns from functions are done via Exit handlers. Apart from the operations specific to the Function Transmutation component (Function Transmutation and destruction), Entry and Exit handlers perform various operations: block permutation, integrity checks, test the presence of a debugger, etc. It should be noted that the figures are schematic in nature, and are included to illustrate how the system works, and are not meant to be all inclusive. Thus, FIG. 6 does not show the Entry and exit handlers (mostly to avoid being too cluttered), whereas FIG. 7 only shows the portions of the RSM and payload relevant to the transformed functions themselves.

Block Transmutation—Build Time

Figure 8:
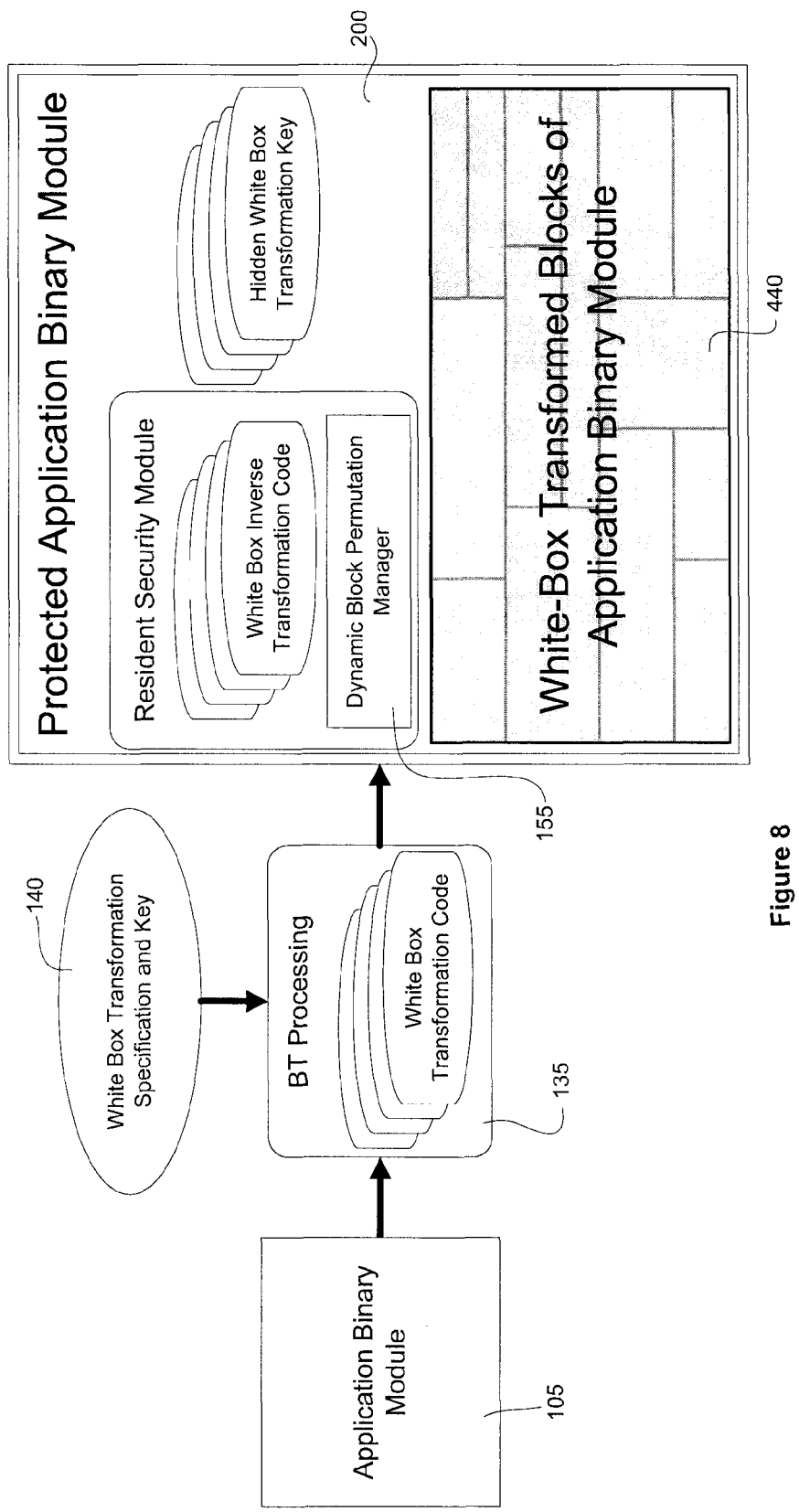
FIG. 8 depicts the protection flow of the Block Transmutation component, according to an exemplary embodiment of the invention.

FIG. 8 depicts the protection flow of the Block Transmutation component 135, according to an exemplary embodiment of the invention, which provides binary protection from dynamic code analysis and attacks while protected application is running in memory. Block Transmutation modifies the binary application by inserting and replacing binary instructions. Moreover, the binary application code is decomposed into white-box transformed blocks which need to be transformed back into an executable state in order to be executed, which occurs upon request at run-time. The BT processing block 135 decomposes the application binary module into its requisite functions, and then breaks each function into blocks. It then transforms the blocks, using a white-box transformation code. The BT has the biggest impact on the application binary structure. Functions that are protected with BT are significantly modified. For instance, some of the original instructions are replaced with new instructions, and some others are relocated within the function address space. Since new instructions are inserted, the size of each function protected with BT is larger. Hence, BT protected functions are relocated into a dedicated binary location. At run-time, functions protected with BT are comprised of a large code segment divided into WB transformed blocks 440. Blocks are divided into groups, and each group of blocks is transformed with a unique white-box key. The resulting binary application keeps its original behavior but is much more tamper resistant. The transformed white-box keys and reverse transformation routines are part of the protected binary module. In addition, the original application's control flow is disrupted and changed constantly during program execution thus preventing binary applications from automated attacks. The Resident Security Module contains a dynamic block permutation manager 155 that randomly modifies the blocks' physical memory address. The white-box transformed blocks are included in the payload mated with the Resident Security Module.

Module Transmutation—Build Time

Figure 9:
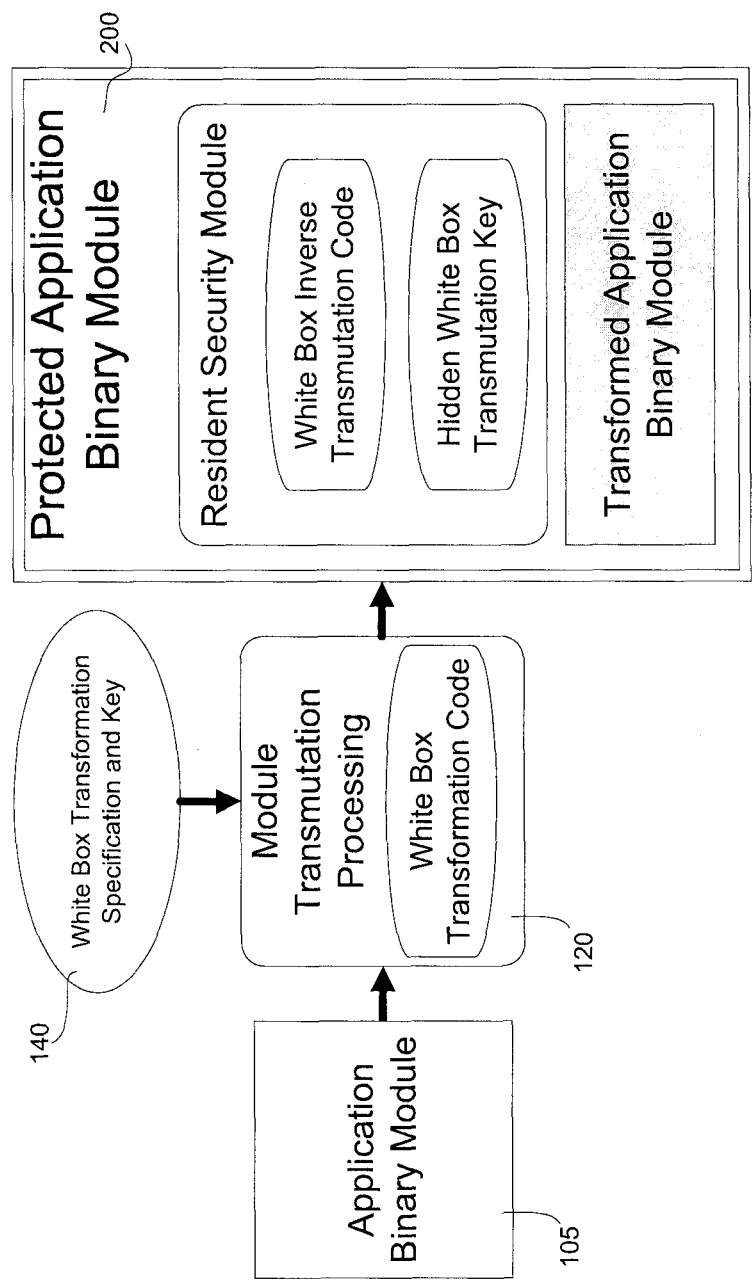
FIG. 9 illustrates the protection process with the Module Transmutation component, according to an exemplary embodiment of the invention.

FIG. 9 illustrates the protection process with the Module Transmutation 120 component that protects binary applications from static analysis and attacks, according to an exemplary embodiment of the invention. In general, the protected application can be composed of several modules (executables and shared libraries), in which case this process is repeated for each module such that the protected application includes multiple transmuted modules. The original binary application 105 is transformed, compressed, and then included as the payload of the Resident Security Module. The resulting protected binary module replaces the original module in the deployed application. The right-hand box in FIG. 9 reveals the structure of the application binary module 200 protected with the Module Transmutation. Apart from the functionality to load applications into memory, for static protection, the Resident Security Module 300 contains procedures to perform the reverse transformation to the payload 360 at execution time and includes integrity verification capabilities. FIG. 9 only illustrates a portion of the payload 360, which forms part of the payload 350.

Integrity Verification—Build Time

Figure 10:
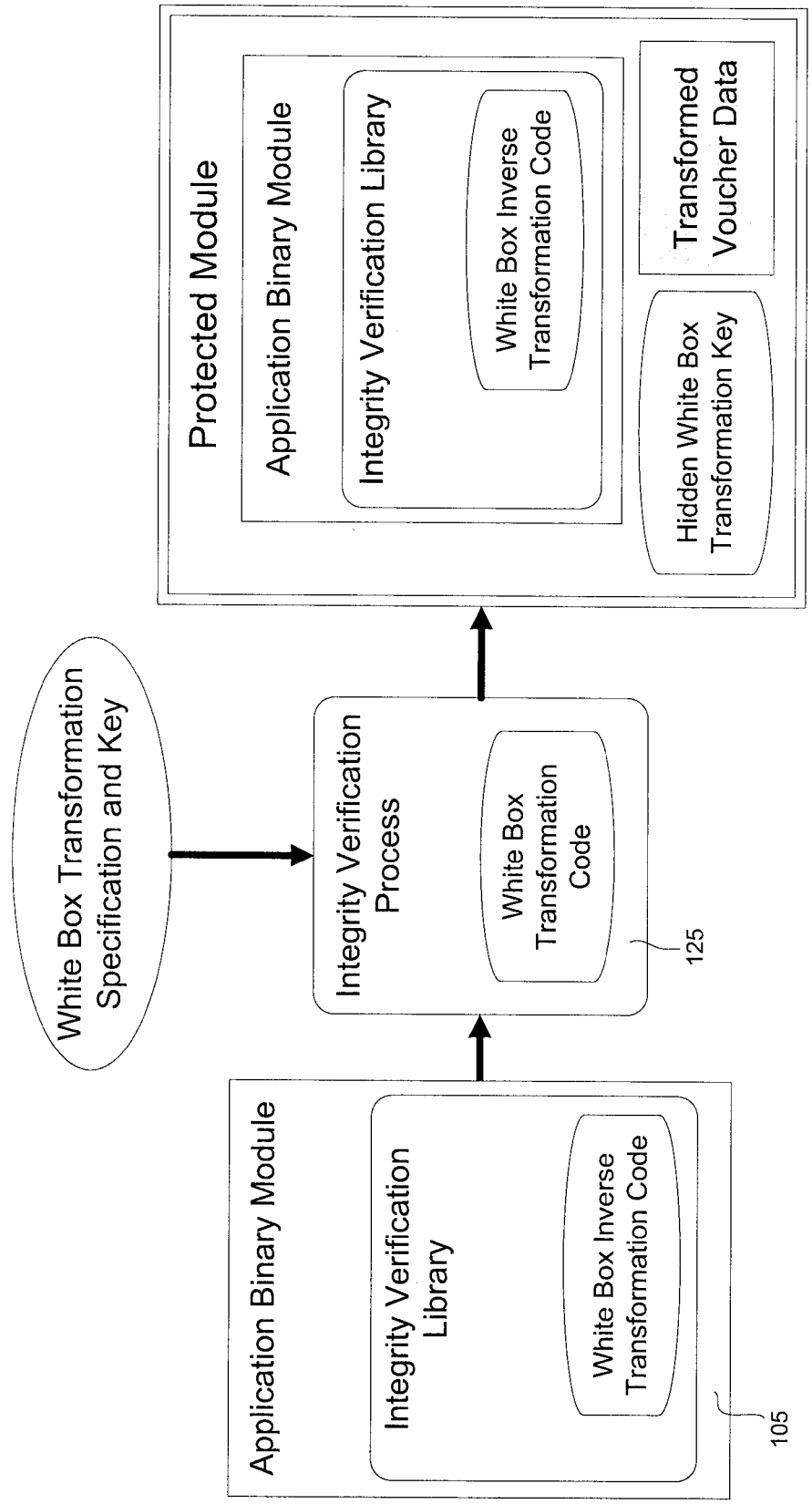
FIG. 10 illustrates the protection process with the Integrity Verification component that detects tampering attacks attempting to modify the behavior of the protected application, according to an exemplary embodiment of the invention.

FIG. 10 illustrates the protection process with the Integrity Verification component that detects tampering attacks attempting to modify the behavior of the protected application, according to an exemplary embodiment of the invention. At build-time the input binary module is digitally signed, creating voucher data The voucher contains a collection of signatures and other related information about the protected application. The voucher data is transformed by IV process 125 using white box algorithms and the transformed voucher data is either embedded into the protected application or exported into a separate file. In general, the protected application can be composed of several modules (executables and shared libraries). In this case, making the application tamper-resistant means that all modules are signed and the voucher data can be stored in a single entity for all modules or preferably, each module has its own voucher data stored independently. Allowing a voucher data for each module not only provides flexibility for the application to update individual modules without re-signing, but also increases the security by allowing each voucher to be transformed with a different key.

The Integrity Verification Transmutation can run in automatic and/or user-interaction modes. Both modes share behavior and principles, but they differ in the way the IV mechanisms are inserted into the protected binary application. In the automatic mode, an IV engine 540 resides in the Resident Security Module and IV components are inserted automatically into the protected binary application at strategic points. In the case of the user-interaction mode, the IV mechanism 550 resides in the Binary Protection Libraries, which are statically linked into the application, based on Calls to IV Library 555 which is inserted into the user's source code before the compilation phase.

Typically, at run-time the structure of protected applications consists of a large number of code segments that dynamically change their state depending on the different binary transmutations that have been applied. Indeed, the protected binary application structure comprises a combination of a plurality of binary transmutations including at least one inter-layer transmutation applied to successively nested layers of said binary application code, with the successively nested layers including the modules comprising the application, the functions comprising a module, the basic blocks of instructions comprising the functions, and the individual machine instructions. Most security-critical functions are protected with BT, and some others with FT. Despite the self-modifying code nature of protected applications, the IV transmutation preferably provides the ability to check integrity of a module, a function or a block. Therefore, the signing phase consists of associating a set of signatures to each code segment that changes its state during execution. They are signed prior and after being transformed. For instance, equation 1 illustrates the signature of block in its both transformed and untransformed states. Consequently, signature of a function protected with BT can be expressed by equation 2, which is a sum of block's signatures that compose the function. When functions are protected with FT, they are transformed as a single piece. Equation 3 represents the signature of a function protected with FT.

$$S_{Block} = \{S_{Transformed\_Block}, S_{Untransformed\_Block}\} \quad (1)$$

$$S_{Function\_BE} = \Sigma \{S_{Transformed\_Block}, S_{Untransformed\_Block}\} \quad (2)$$

$$S_{Function\_FE} = \{S_{Transformed\_Function}, S_{Untransformed\_Function}\} \quad (3)$$

Figure 29:
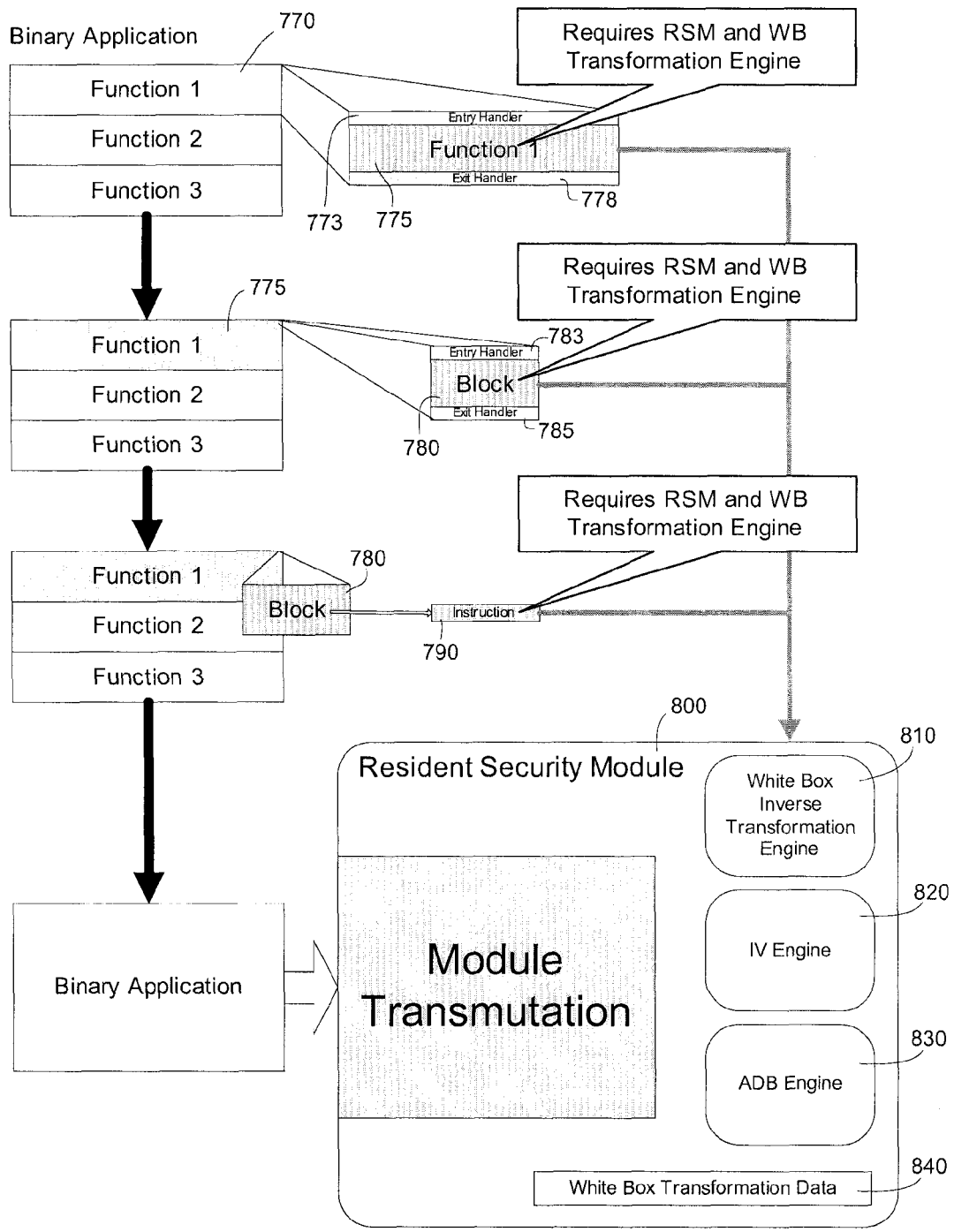
FIG. 29 illustrates the successively nested layers, and how the transmutations are applied to them, according to an exemplary embodiment of the invention.

Before we discuss exemplary embodiments of the run-time processing we refer to FIG. 29, which is a different schematic illustrating the successively nested layers, and how the transmutations are applied to them, according to an exemplary embodiment of the invention. In this example, we are illustrating only one module, although it should be appreciated that additional modules may be involved. In this example, the module is divided into 3 functions. We will only discuss one exemplary function, namely Function 1, labeled as 770. This function comprises a plurality of blocks, each of which comprise a plurality of instructions. The FT processing block transmutes function 1 into a transformed form 775, which includes entry handler 773, and exit handler 778, and will no longer operate without interlocking code/data from the RSM and WB transformation engine 810. However, Function 1 comprises multiple blocks, each of which are also transmuted. For example, the BT processing block transmutes a block into a transformed form 780, which includes entry handler 783, and exit handler 785, which also will no longer operate without interlocking code/data from the RSM 790 and WB transformation engine 810. Similarly Block 780 includes one or more instructions, which are transformed into a transformed form 790 which also will no longer operate without interlocking code/data from the RSM 790 and WB transformation engine 810. Further, the RSM 800 not only incorporated the successively nested interlayer transmutations discussed above, but also incorporates IV engine 820 and ADB engine 830 which add intra-layers of protection to one or more of said layers, and/or to the entire transmuted module.

Note that the above was described in a top-down order. That is to say, as Functions encapsulate blocks, we described FT prior to BT. However, it should be appreciated that in practical terms, embodiments first analyze the functions, and decomposes each function into blocks, transforms the blocks, effectively transforming the function. FT processing is then applied to the transformed function, as described above. At runtime, the process would be reversed, with the function transformation removed first, exposing the transformed blocks and the transformed blocks having their transformations removed as they are executed.

Run-Time Processing

Figure 11:
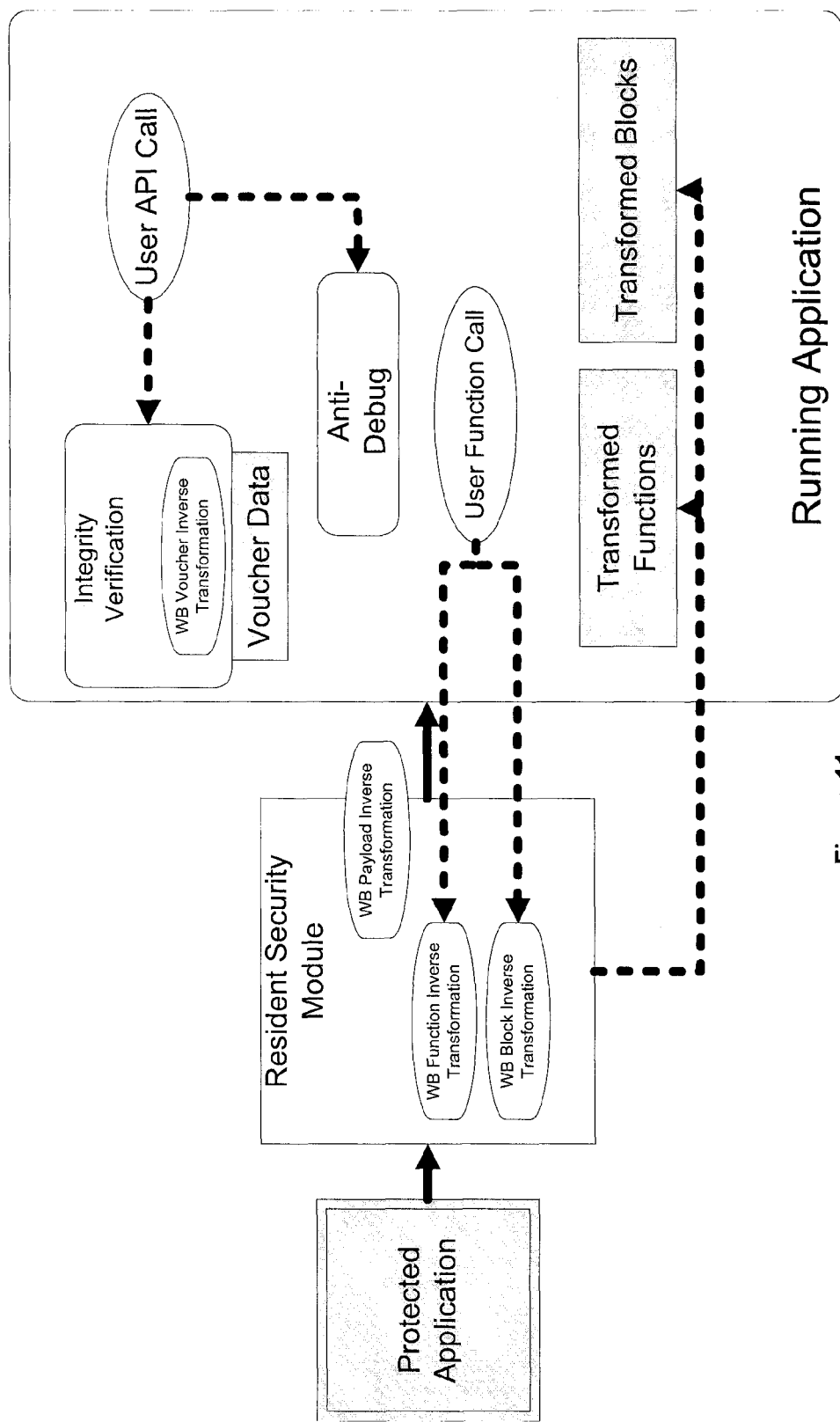
FIG. 11 is an overview of how the protected application executes securely at run-time, according to an exemplary embodiment of the invention.

FIG. 11 is an overview of how the protected application executes securely at run-time. As is shown in FIG. 6, the protected binary application is composed of a RSM 300 and its transformed payload 350. The structure of the payload is dependent on the binary transmutations applied at build time. When the protected binary application starts, the RSM takes control and prepares the payload to run. Effectively, the RSM replaces the OS loading process. The RSM contains information about the protected application and allocates memory space where the transformed payload will be located when the reverse transformation is applied. Prior to dealing with the transforms on the payload, the RSM performs three operations: 1) initializes the security engines, 2) runs the Anti-Debug component and 3) checks the integrity of the payload.

After the payload has been set up in memory, the RSM prepares the run-time security support and then transfers control to the payload, which is composed of transformed functions and transformed blocks. Additionally, the application contains integrity information related to blocks, functions and the entire application module. Functions and blocks are dynamically transformed into an executable state upon request and destroyed after execution. As a result, only a fraction of code will be in clean form at run-time. During the initialization phase, the RSM manages Entry and Exit handlers, which are responsible for function and block transformation and destruction. In addition, these handlers perform other security activities, such as integrity checks, code relocation, code deploying and the detection of a debugger attached to the protected application. Integrity verification allows for automatically checking the integrity of a block, a function or the entire application.

Code relocation capabilities mean that after each function invocation, the function changes dynamically in structure. This is possible by permuting the function blocks' physical memory address. Dynamic code relocation represents an excellent defense against automated and dynamic attacks. As the Entry and Exit handlers are key elements in offering dynamic protection, they are also preferably protected themselves. Each handler can check its own integrity and re-structure itself periodically. In addition, the handler checks if any debugger is attached to the protected application.

Module Transmutation—Run-Time Process

Figure 12:
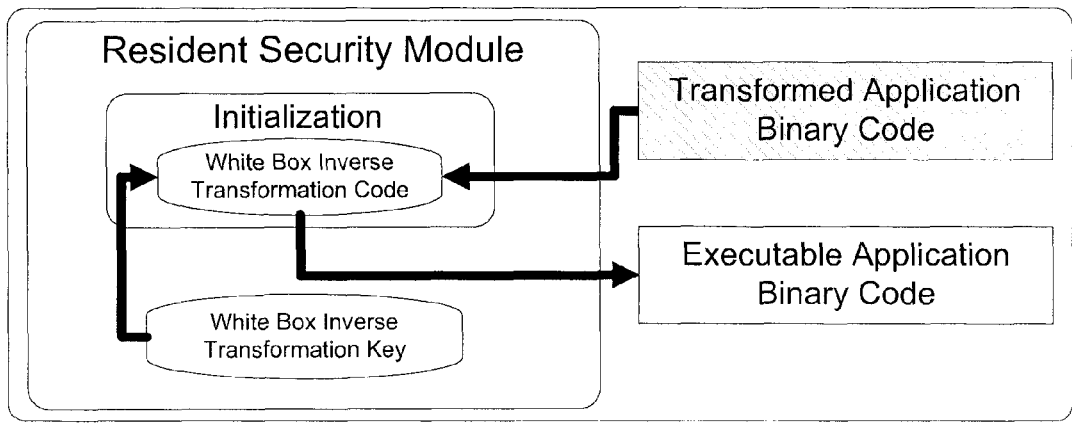
FIG. 12 illustrates the Module Transmutation (MT) component during run-time execution, according to an exemplary embodiment of the invention.

FIG. 12 illustrates the Module Transmutation (MT) component during run-time execution. When the protected application is loaded into memory, the RSM takes control and performs some security operations. Firstly, the RSM verifies that the protected application is not under debugger control and checks integrity for itself and the payload then transforms the payload into a state ready for execution. The MT component is primarily intended for static protection. It prevents attackers from analyzing the payload on the disk. After the payload is deployed, other security components embedded into the payload and in the RSM, take control and protect applications from dynamic analysis and attacks. In addition, the payload contains run-time data related to the binary protected application.

Integrity Verification Transmutation—Run-Time Process

Figure 13:
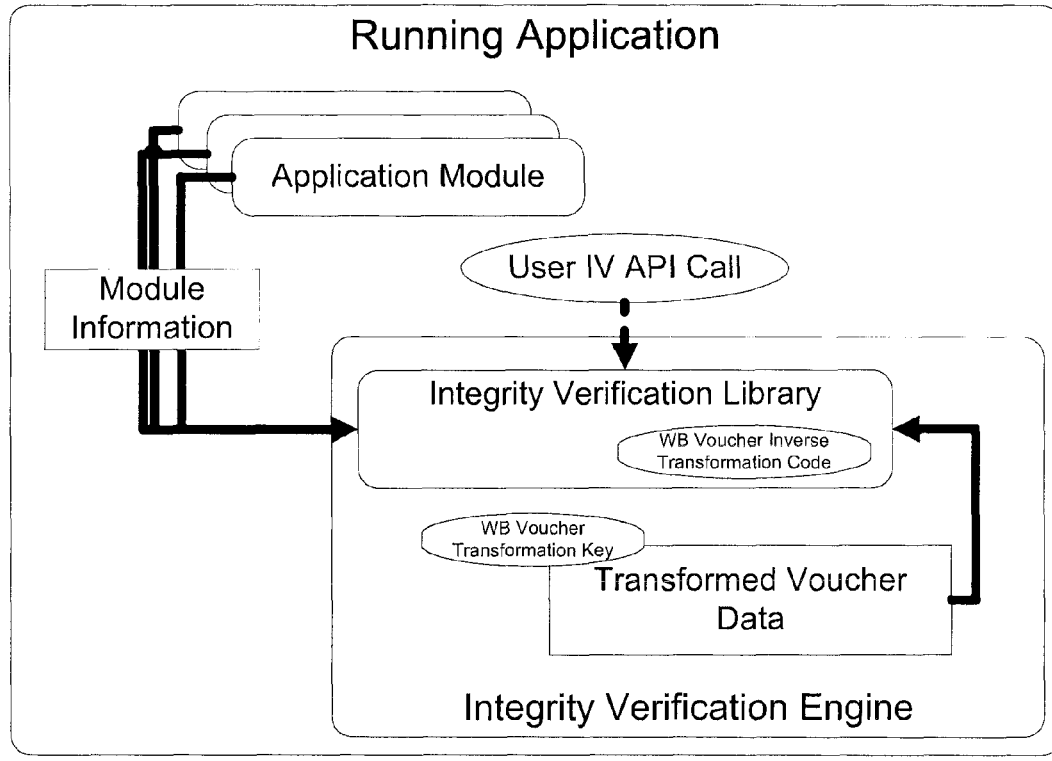
FIG. 13 illustrates the run-time process of the Integrity Verification component, according to an exemplary embodiment of the invention.

FIG. 13 illustrates the run-time process of the Integrity Verification component. When the protected application is deployed into memory, its structure is comprised of code segments that are dynamically transformed into an executable state upon request and destroyed again after execution. The IV Transmutation (IV) ensures that the in-memory code segment of a protected application or any of its components have not been tampered with and that the disk image of the application has not been externally modified. The basic principle relies on comparison of integrity verification data generated at protection/build time with the run-time image of the protected binary application. Every time a block or function changes its transformed state, the run-time signatures are updated appropriately. Therefore, it is possible to check the integrity of self-modifying code applications, such as binary applications that are composed of segments that dynamically change their transformation states.

Figure 14:
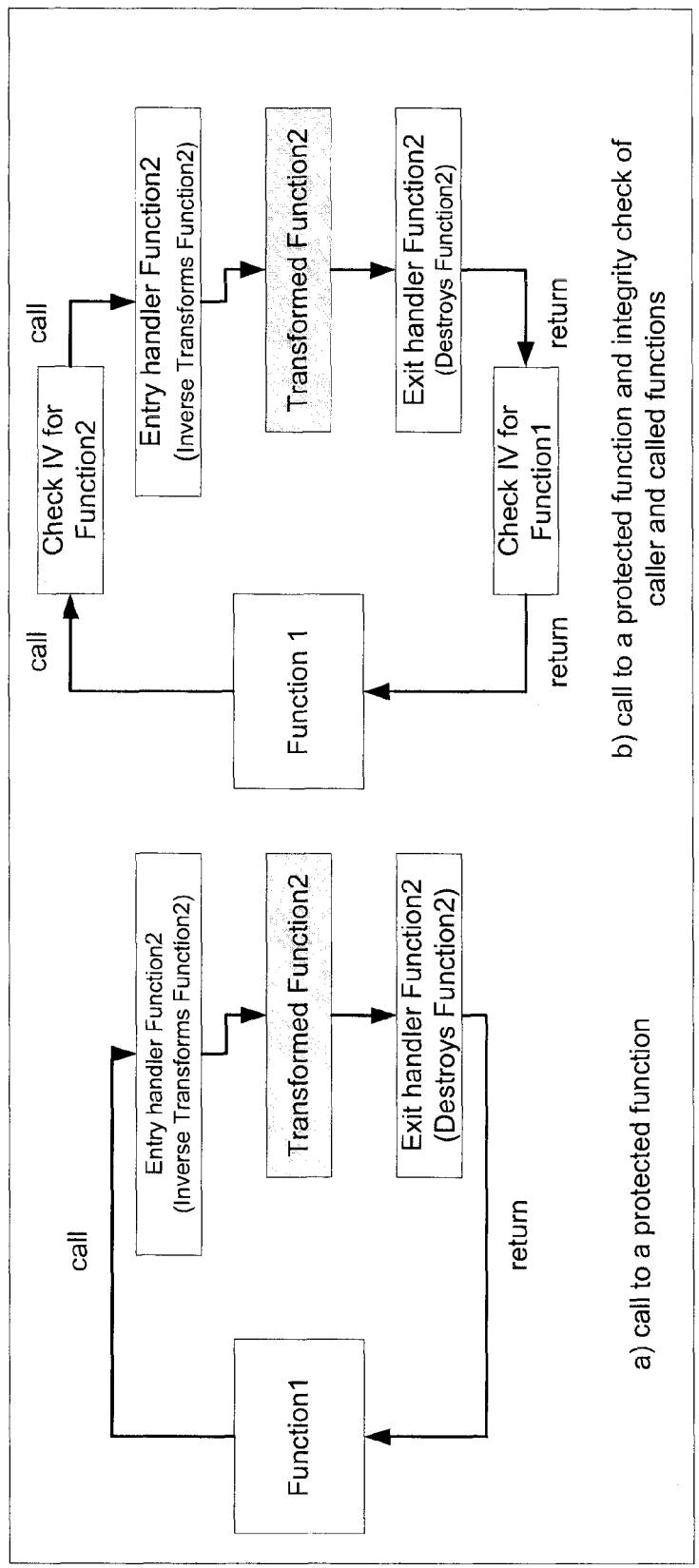
FIG. 14 depicts an example of automatic IV calls, by illustrating run-time function processing, both with and without IV, according to an exemplary embodiment of the invention.

In automatic mode, the IV can verify integrity of a module, a function or a block. According to the desired security level, calls to IV are inserted at strategic points in various forms. For instance, when functions are protected with the Block Transmutation (BT), prior to each block execution, the IV checks the block's integrity or the integrity of all blocks that compose a function. Checking the integrity of a function means checking the integrity of all blocks that comprise that function, while the integrity of a module is comprised of multiple signature values that belong to BT/FT protected functions as well as the rest of the application code. FIG. 14 depicts another example of automatic IV calls, by illustrating run-time function processing, both with and without IV. Using a dual signature scheme, functions can be verified prior to execution, which represents an excellent defense strategy. FIG. 14.a) represents a basic call to an FT protected function, while 14.b) illustrates a call to an FT protected function containing integrity checks of the both the caller and called functions.

In user mode, the IV provides a set of APIs that check the integrity of a module or a function. In addition, users can control when IV checks occur by inserting them into the source code. The Integrity Verification functionality allows the user to check the integrity of a module in several ways. First, the entire unchanging set of bytes that comprise the application (i.e. the code and read-only data) can be checked whenever the corresponding IV API is invoked. This API allows the user to specify how much of the application is to be checked on each invocation for the purposes of tuning the performance. In addition to this overall module checking, the IV API allows the user to check if the function that is currently executing has been modified since build time. As described above, functions and blocks that are dynamically transformed and executed can be checked for integrity before and after execution.

Function Transmutation—Run-Time Process

In general, during the application module execution, when a protected function is invoked, its entry function handler is first executed and interacts with the white-box transformation run-time facility to inverse-transform the white-box transformed function code by executing the white box transformation inverse operation using the white box transformation run-time key data and operation codes specific to the function; loading the inverse-transformed functions into execution memory; and transferring the execution control to the function and, upon exit from the function, invoking the function's exit handler. Optionally, RSM, for each function, clears or scrambles the function's memory footprint before returning. Additionally, intra layer protection can be invoked such that one or both of an IV or ADB transmutation is interlocked with the FT applied to a function being protected by applying the IV, ADB or both transmutations to the entry and exit function handlers implicitly.

Figure 15:
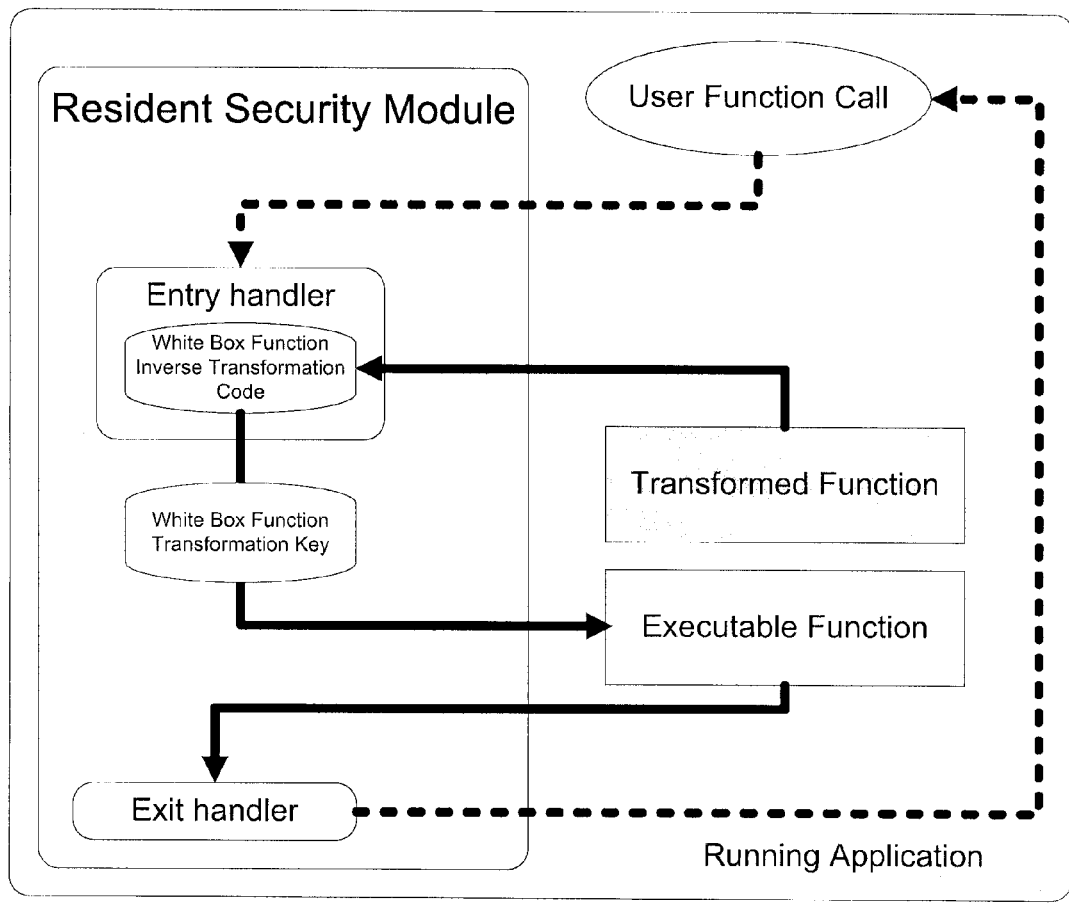
FIG. 15 illustrates the Function Transmutation (FT) component during run-time execution, according to an exemplary embodiment of the invention.

FIG. 15 illustrates the Function Transmutation (FT) component during run-time execution, according to an exemplary embodiment of the invention. Even after the RSM transforms the payload into an executable state, some functions can remain transformed. In addition, the RSM installs Entry and Exit handlers for each protected function. When a protected, transformed function is invoked, its Entry handler gains control and performs the appropriate inverse transformation to restore the function to an executable state using the necessary white box key. As stated earlier in this document, each function can be transformed using a unique key. Prior to performing the transformation operation, the Entry handler, if desired, performs various other operations (integrity checks, anti-debug), as specified at protection time. After transforming the function into an executable state, the Entry handler transfers the control to the function for execution. The return from the function is intercepted by the function's Exit handler, whose main role is to destroy the function content and return control to the caller. As in the Entry handler, the Exit handler can perform a variety of security operations as specified at protection time.

The FT component allows users to define a dynamic counter, which specifies the frequency of functions' run-time destruction/transformation. By default, the counter is set to 1. Every function has its own dynamic protect counter. This counter allows the user to tune the protection for security vs. performance. If the counter is set to 5, for example, the function can be invoked 5 times before the Exit handler destroys the function content.

Block Transmutation—Run-Time Process

Figure 16:
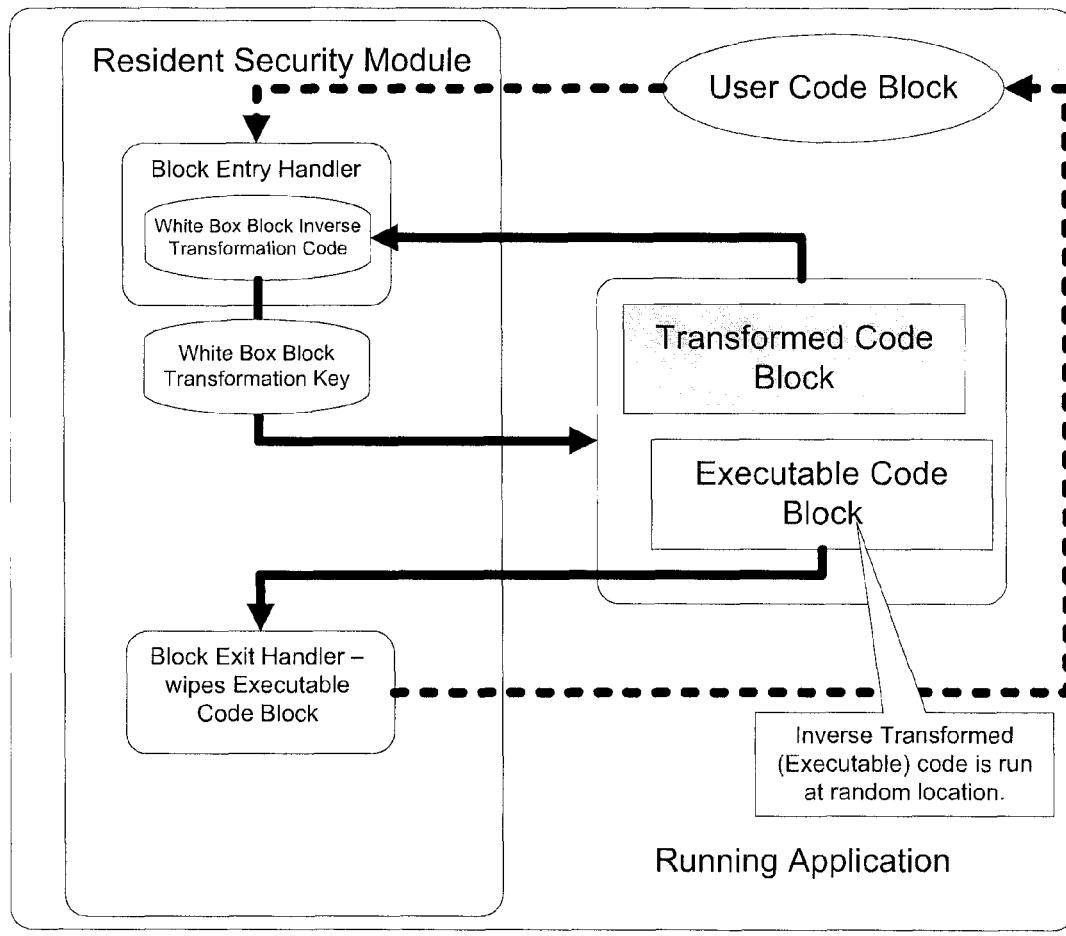
FIG. 16 illustrates the run-time process of the Block Transmutation (BT), according to an exemplary embodiment of the invention.

FIG. 16 illustrates the run-time process of the Block Transmutation (BT) component which is charged with protection against dynamic analysis and attack. The central principle relies on the decomposition of binary applications into discrete blocks. At build-time, the blocks are transformed using white box transformations. At run-time, blocks are dynamically transformed back into an executable state upon request. Preferably only a minimal number of blocks (and ideally only one block) will be in clean form at run-time, with remaining blocks still un-transformed. After execution, blocks are destroyed, BT and FT share the same basic principle: transformation-execution-destruction, but they are implemented differently. Functions protected with BE are modified at build time. For instance, calls to transformation routines are inserted within the protected function.

Dynamically transforming blocks instead of entire functions constitutes an additional layer of protection over and above that offered by the FT. For example, according to the function's input parameters, some blocks are not executed. Consequently, they are never transformed into an executable state and vulnerable to analysis, lifting, and tampering.

Figure 17:
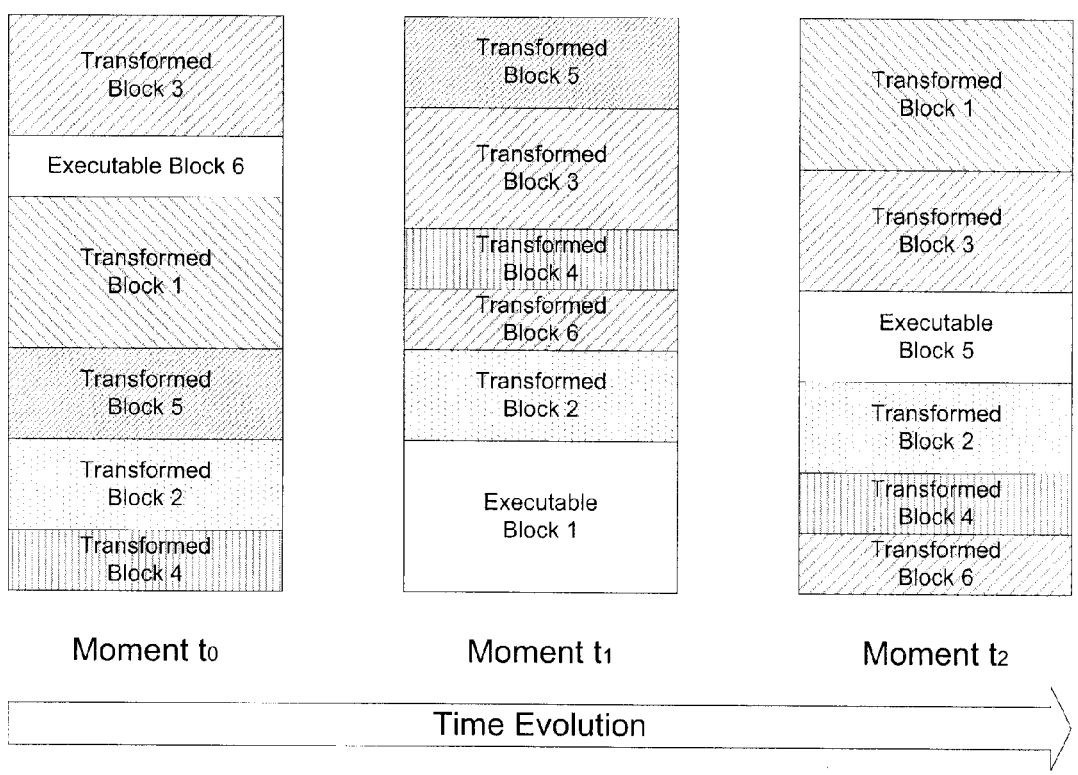
FIG. 17 illustrates an example of a protected application at different moments of its execution, according to an embodiment of the invention.

In addition, blocks that belong to the same function are constantly permuted in memory. Dynamically transforming blocks and permuting their position in memory is an excellent defense strategy against automated and dynamic attacks. FIG. 17 illustrates an example of a protected application at different moments of its execution. The frequency of block permutation can be defined by users among with the input security options.

Dynamic Function Loading

In addition to the technologies outlined above, the technology infrastructure provided by this system can also enable the dynamic loading of protected functions. This dynamic loading functionality allows the user to protect the function using a White Box transformation, load the function when needed, invoke the function, then securely erase the function from memory. In addition to allowing for easy function updates without changing the base application, this system minimizes the time the protected function is in the clear in memory.

Dynamic Function Loading—Build Time

Figure 18:
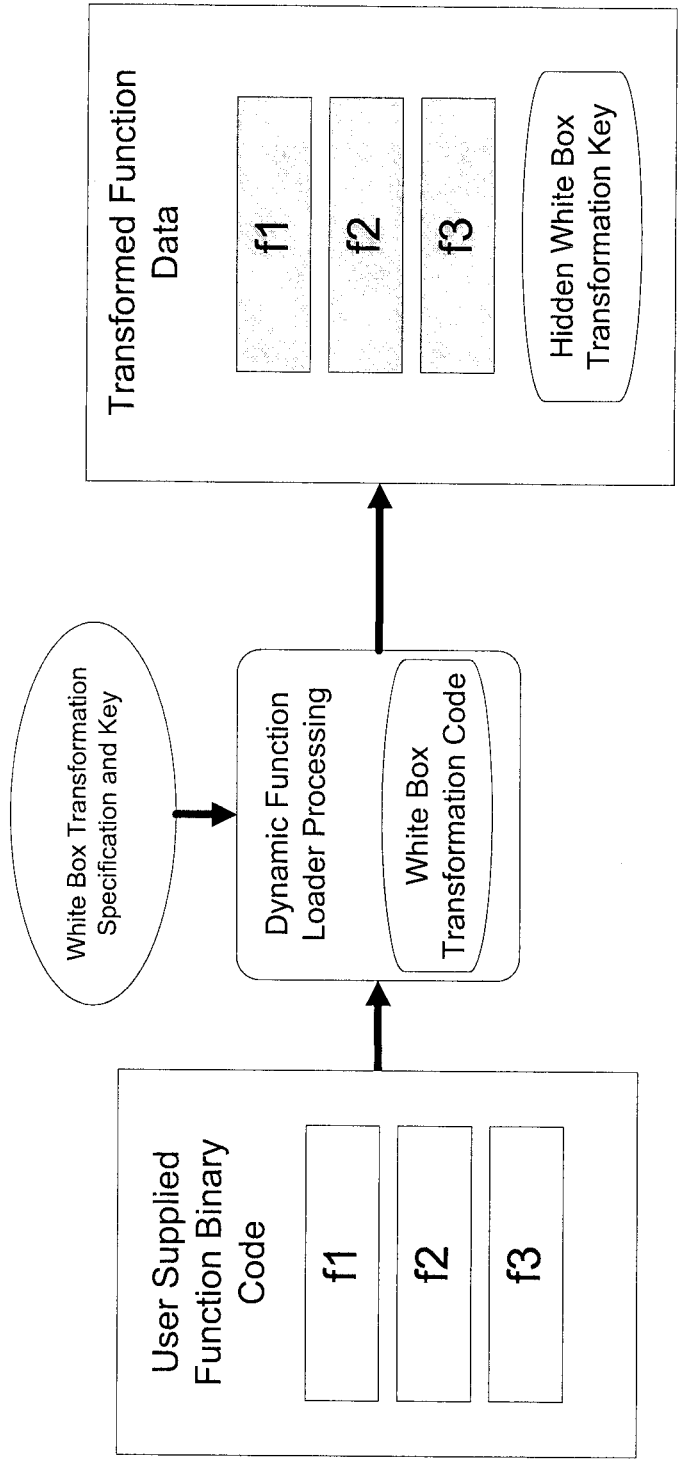
FIG. 18 illustrates the build time process of the dynamic function loading according to an embodiment of the invention.

FIG. 18 illustrates the build time process of the dynamic function loading. The user supplies the functions that are to be protected. These are processed through the Dynamic Function Loader processing engine in conjunction with the user-supplied White Box transformation key and algorithm specification. The process produces a protected data module that contains the transformed functions and the hidden white box inverse transformation key. This data module can then be supplied to the application in a variety of ways (download, etc.). This allows the user to easily change the nature or protection level of the functions without having to rebuild, retest, and redeploy the original application. It also allows the user to place function code (in the form of this data module) into areas on the target system that might not normally allow for code binaries such as executables and dynamically loaded or shared libraries.

Dynamic Function Loading—Run-Time Process

Figure 19:
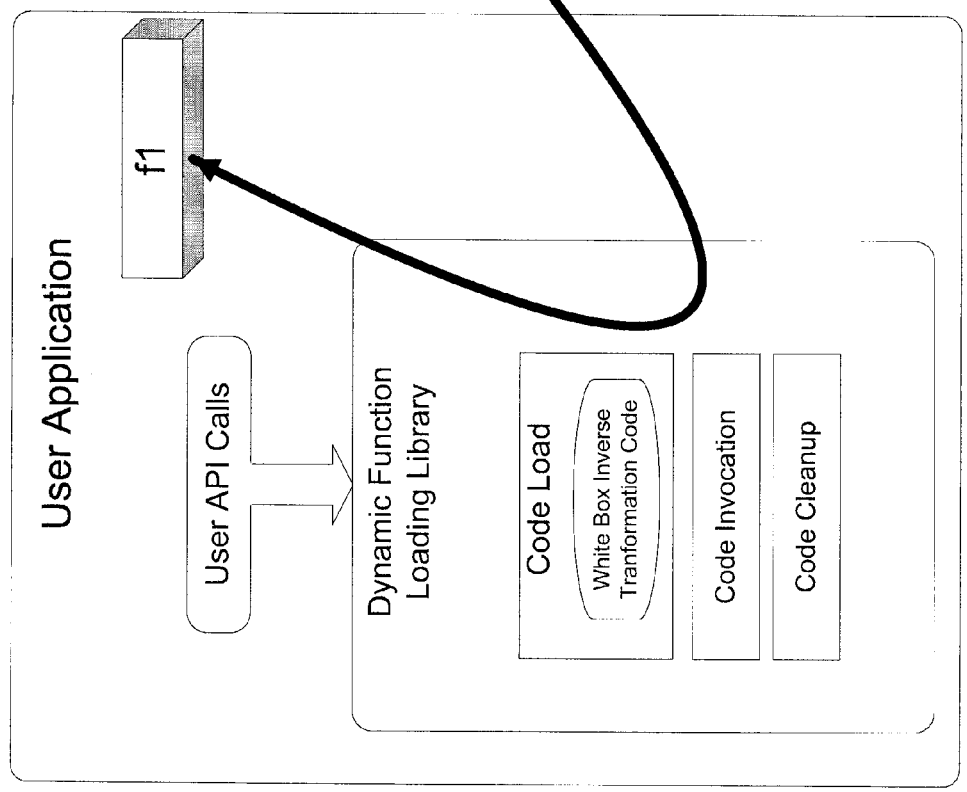
FIG. 19 describes the run-time process of the Dynamic Function Loading, according to an embodiment of the invention.

FIG. 19 describes the run-time process of the Dynamic Function Loading. At runtime, the application makes a call into the Dynamic Function Loading library specifying which protected data module is to be loaded and which function is to be invoked. The library then finds the function in protected data module and transforms it into an executable form into memory. The library then invokes the function on behalf of the application and returns the results. After invoking the function, the application can then ask that the function be securely erased from memory.

Figure 20:
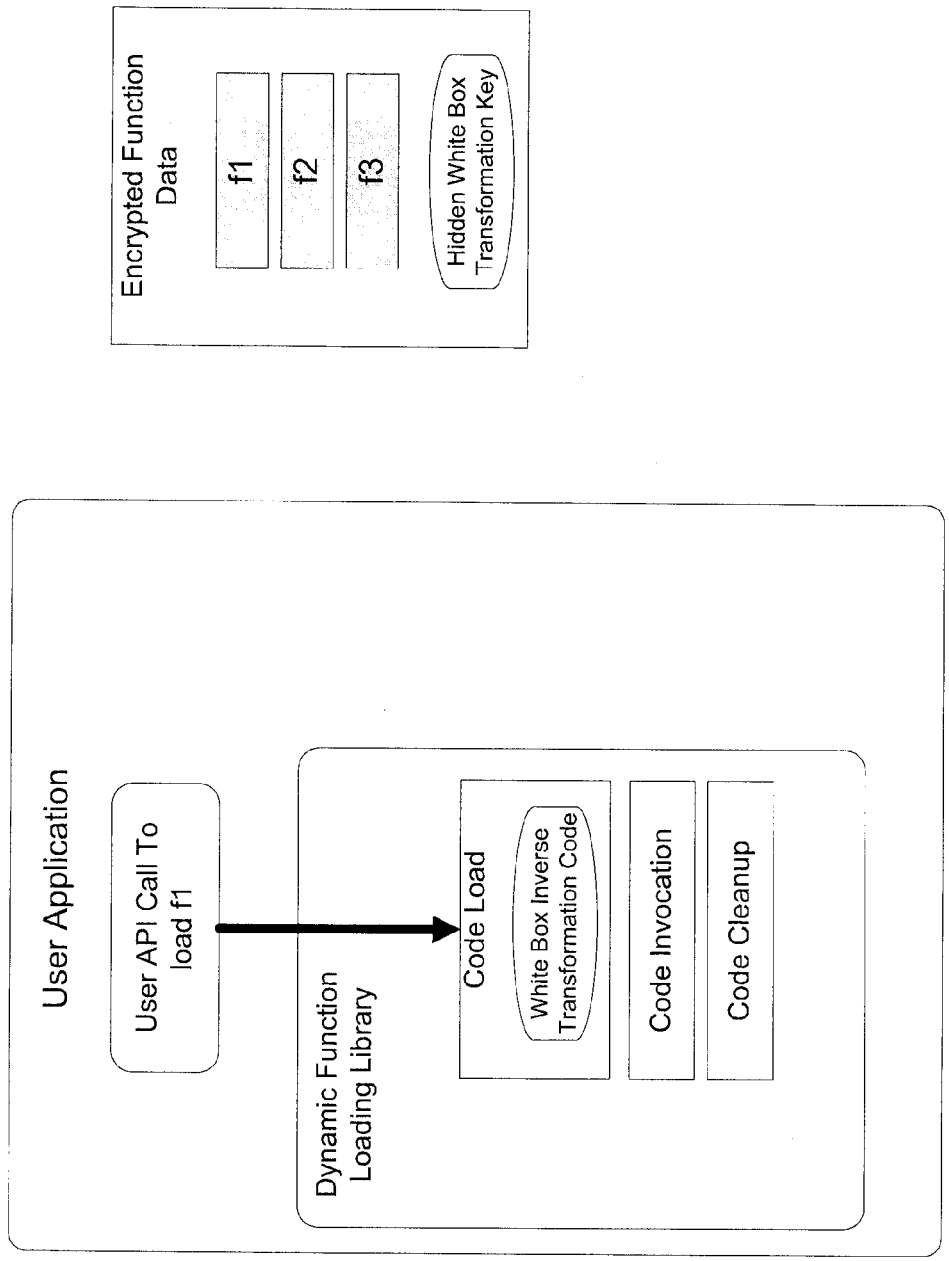
FIG. 20 illustrates an example of the first phase of the process of the Dynamic Function Loading, according to an embodiment of the invention.

The run-time process of the dynamic function loading is divided into several phases. FIG. 20 illustrates an example of the first phase of the process. In this phase, the calling application specifies which protected data module contains the desired function. The Dynamic Function Loading Library then identifies the function in the library.

Figure 21:
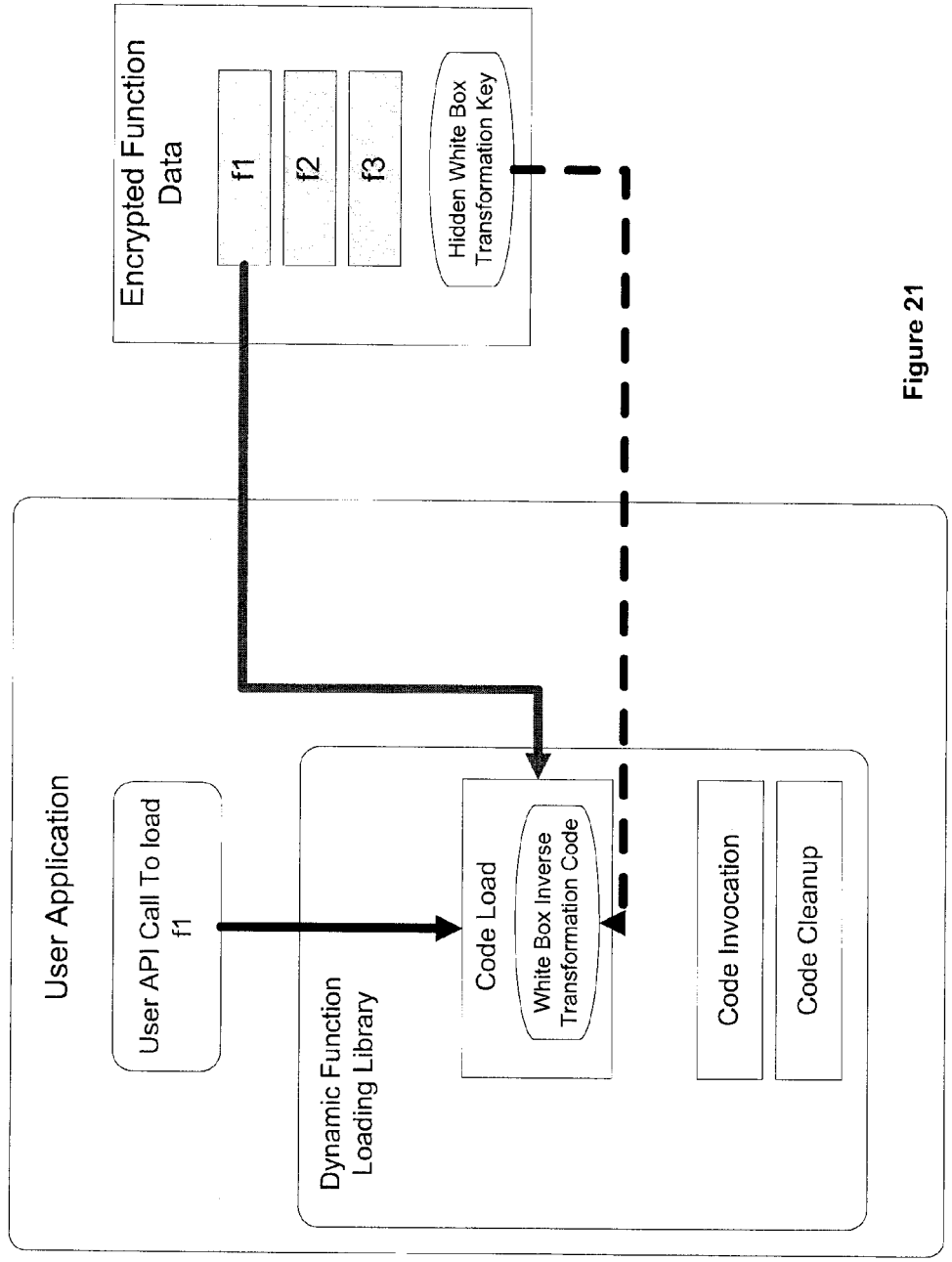
FIG. 21 illustrates an example of the second phase of the process of the Dynamic Function Loading, according to an embodiment of the invention.
Figure 22:
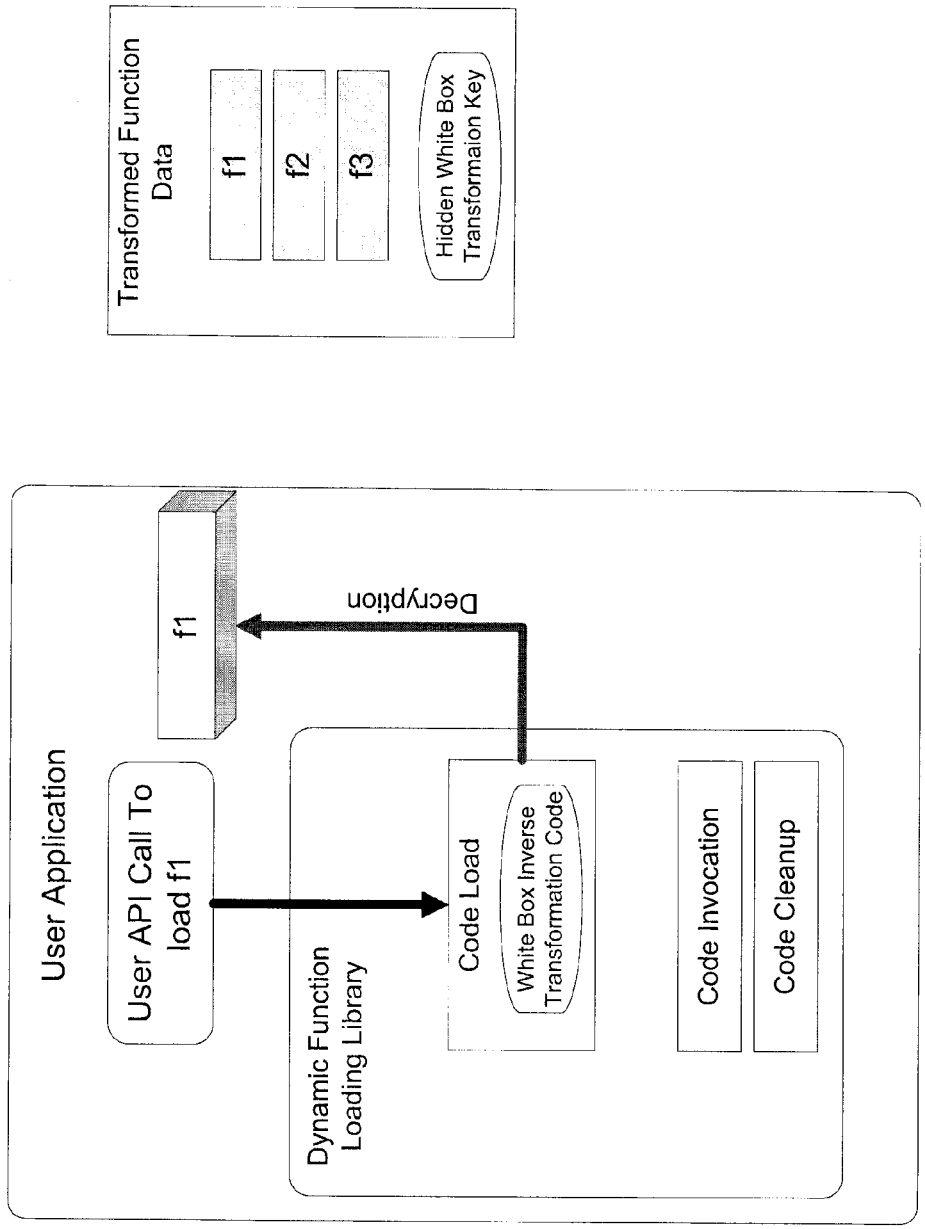
FIG. 22 illustrates an example of the third phase of the process of the Dynamic Function Loading, according to an embodiment of the invention.

FIG. 21 illustrates an example of the second phase of the process. In this phase, the In this phase, the Dynamic Function Loading Library obtains the hidden White Box transformation key and prepares to apply the inverse transformation the desired function. FIG. 22 illustrates an example of the third phase of the process. In this phase, the data containing the code for the desired function is transformed into an executable state, placed into memory and prepared for invocation.

Figure 23:
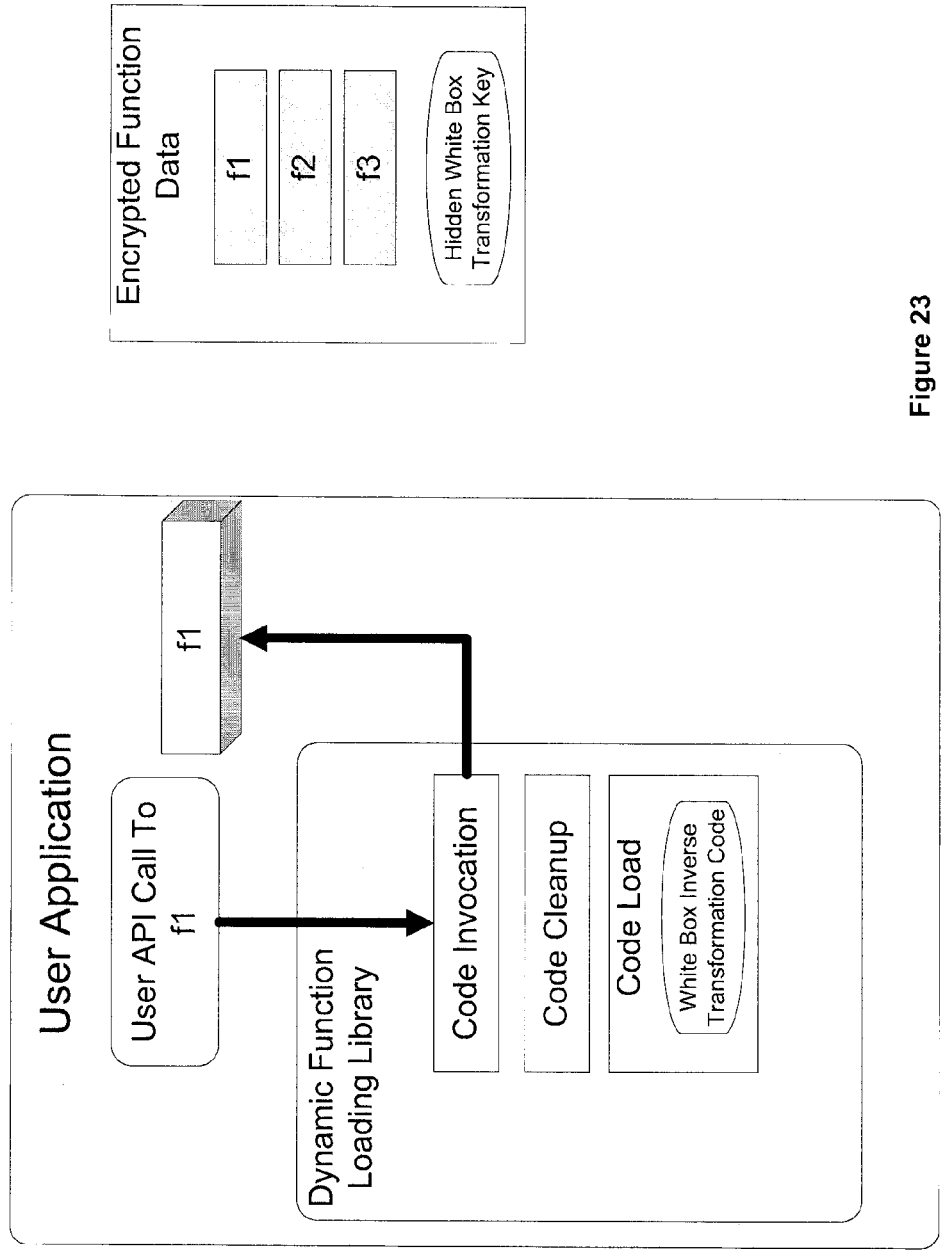
FIG. 23 illustrates an example of the fourth phase of the process of the Dynamic Function Loading, according to an embodiment of the invention.
Figure 24:
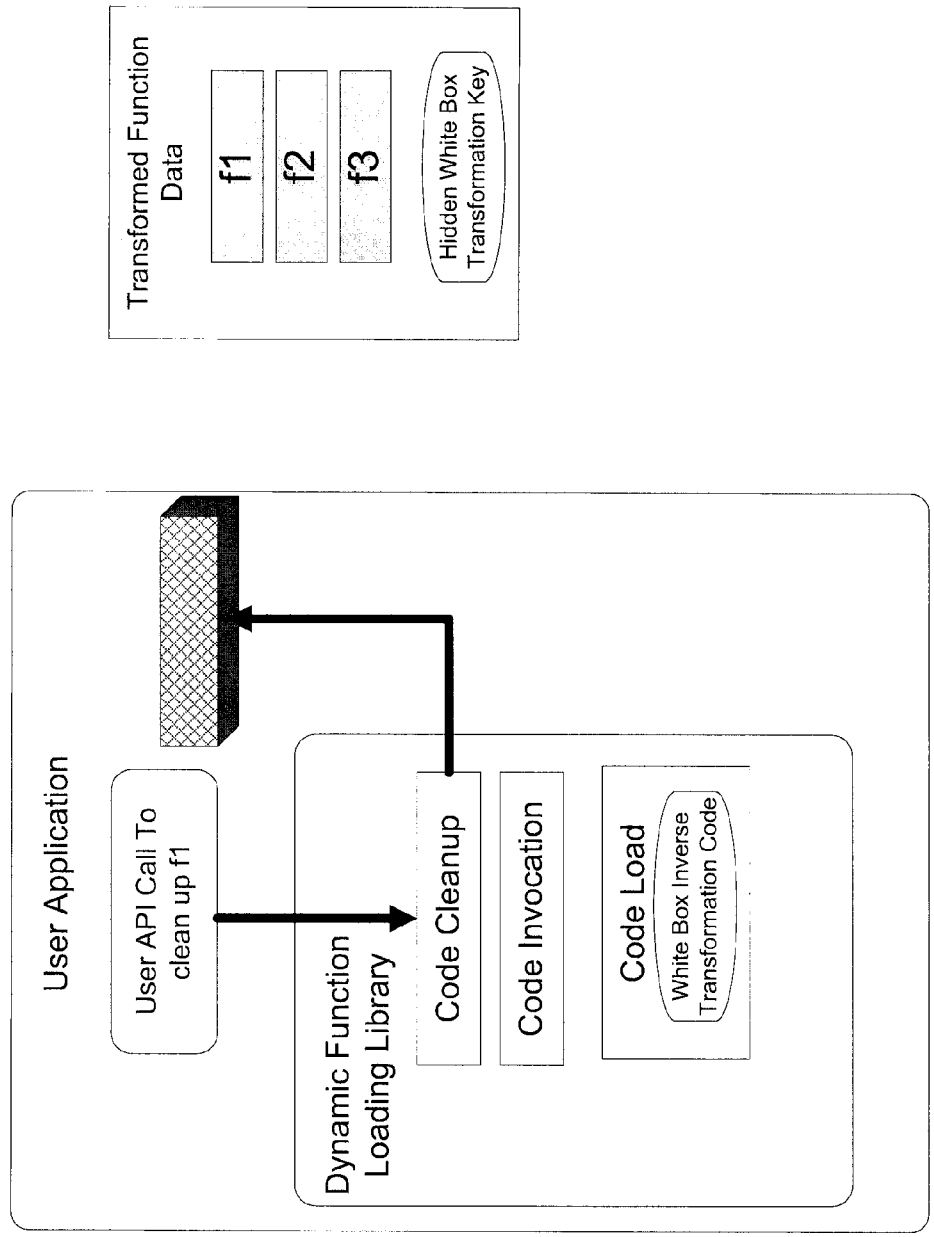
FIG. 24 illustrates the final phase, in which, the calling application may request that the function be securely erased, according to an embodiment of the invention.

FIG. 23 illustrates an example of the fourth phase of the process. In this phase, the Dynamic Function Loading Library invokes the function on behalf of the calling application. The application has supplied the parameters to the function, which are passed on by the library. The return code from the function is then sent to the caller after the function completes. FIG. 24 illustrates the final phase, in which, the calling application may request that the function be securely erased. The library then erases the function from memory. If the function needs to be invoked again, it must again be transformed into an executable state and loaded by the library.

Figure 25:
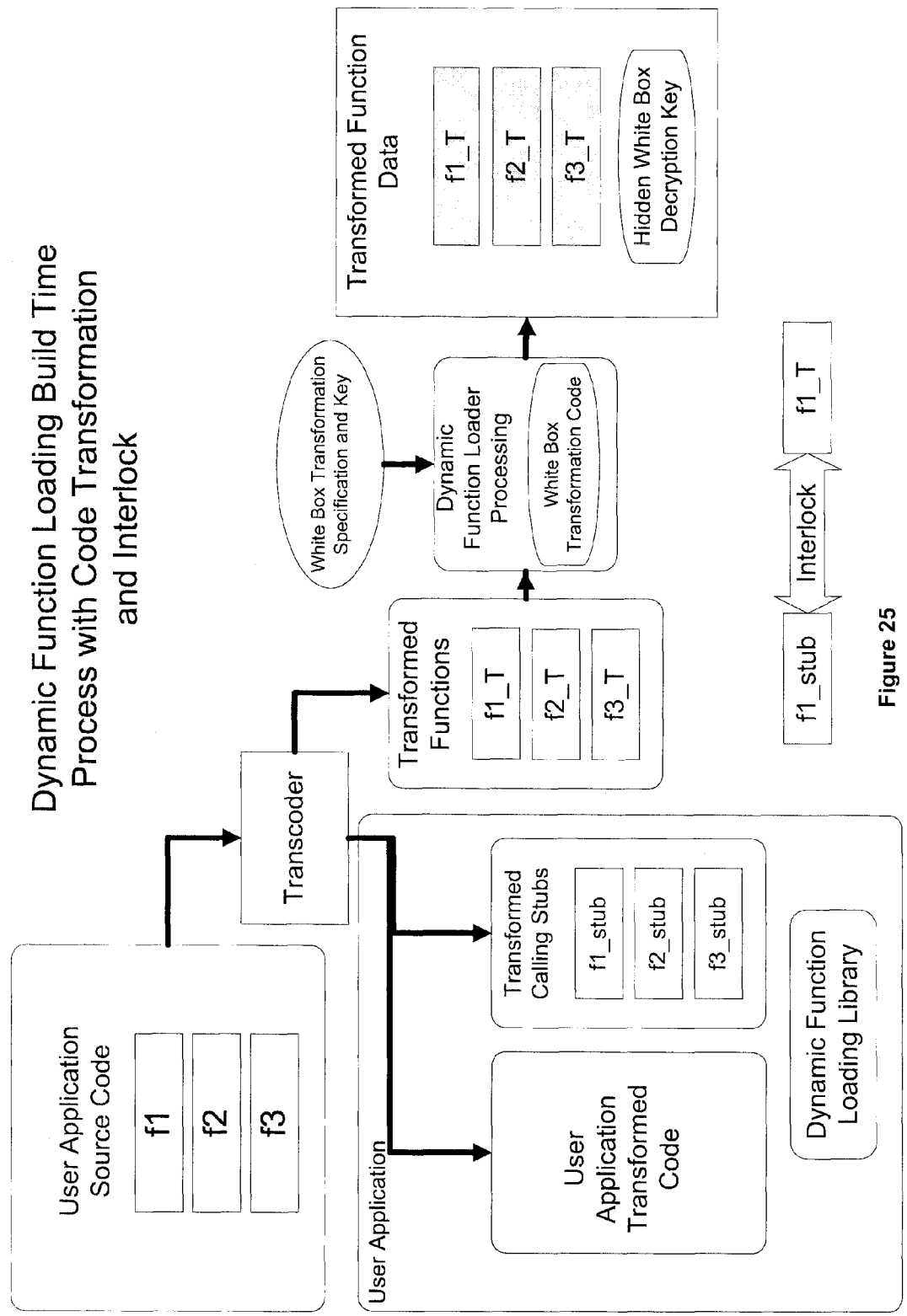
FIG. 25 illustrates an example of the build time process for dynamic function loading with code transmutation and interlocking, according to an embodiment of the invention.

FIG. 25 illustrates an example of the build time process for dynamic function loading with code transmutation and interlocking. Dynamic Function Loading provides an infrastructure for greater security techniques to be applied. For example, any of the function protection techniques outlined in previous sections can be used:

Block Transmutation
Function-based Integrity Verification
Block-based Integrity Verification
Antidebug Greater security can also be obtained by combining Dynamic Function Loading with source code transformations. In the example illustrated in FIG. 25, the user supplies an application containing 3 functions that need to be protected. By applying source code transformations via the Transcoder, the system can create an application containing transformed stubs for the functions that are strongly interlocked with the transformed functions. These functions can then be protected using the Dynamic Function Loading mechanism. Using code transformations in this manner will make it very difficult for an attacker to replace the protected functions while the Dynamic Function Loading technique makes it difficult to lift the protected functions from memory. In addition, this technique allows the user to replace the protected functions easily, perhaps to respond to an attack on the initial implementation.

Interlocking Security Technologies

Interlocking aims at raising the security standards by creating strong correlation between various security technologies. It focuses on critical code and data. Key components of a certain security engine depend on the values produced by other security component. Such an example of interlocking security engines is illustrated in FIG. 14, where the integrity is checked prior the dynamic transformation of the verified function. Nevertheless, interlocking can be much more complex. For instance, IV and AD components provide Fail and Success callback routines that contain parts (executable code) of another security component.

Figure 26:
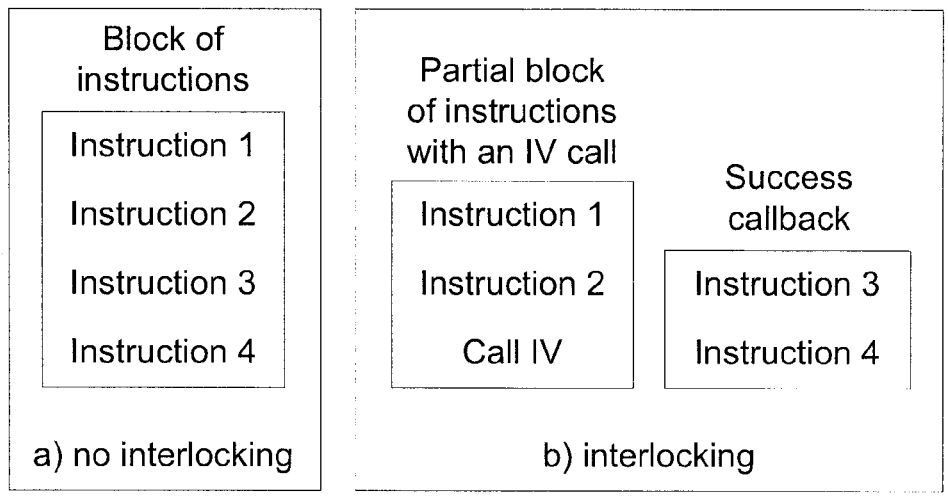
FIG. 26 depicts an interlocked form of the BT and IV components, according to an embodiment of the invention.

For example, FIG. 26 depicts an interlocked form of the BT and IV components. Part of the instructions that compose a block are relocated into the success callback of the IV engine. Therefore, they are executed depending on the success or failure of the verification. In case of IV failure, the computation is not complete and the hacker attack will fail.

Key Splitting

Figure 27:
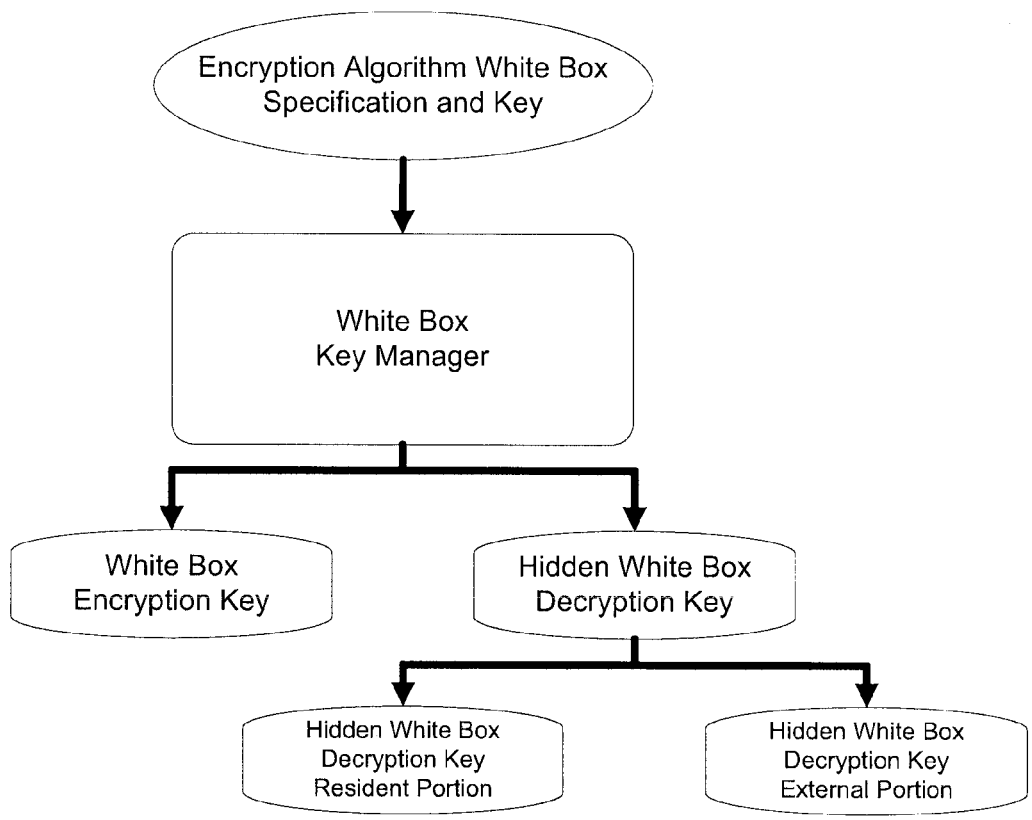
FIG. 27 illustrates an example of key splitting, in which, at protection time, the hidden decryption key is decomposed, according to an embodiment of the invention.

An important security paradigm in cryptography consists of protecting the decryption key. Using white box technology is a huge step forward in meeting this requirement. Mathematical transformations are applied to the decryption key that known only by the decryption routine, resulting in a decryption operation that does not expose the key even if the attacker is observing each instruction execute. The present invention introduces an additional security measure that consists of splitting the hidden decryption key into 2 parts. One internal part, embedded into protected binary application, and an external part that end-users must provide at the execution phase. FIG. 2 illustrates the process of generating both the encryption 30 and hidden decryption key 35. At protection time, the hidden decryption key is decomposed as depicted in FIG. 27. At run-time, the RSM is in charge of the key reconstitution. The technique extends to any white box transformation. The key splitting feature applies to all security components that use WB transformations: MT, IV, FT and BT.

For example, the manufacturer of a device can place part of the key in a secure store on the device. When a protected application is invoked, this part of the key can be retrieved by executing code on the device that retrieves the key from the secure store. The complete White Box key can now be reconstituted and used to decrypt the payload of the protected application, used to decrypt voucher data, or used for function and/or block transformations. An attacker getting the key fragment from the secure store cannot do anything with it, neither can an attacker that manages to extract the key fragment from the application. Additional use of interlock technology can make it very difficult to perform any decryption operations outside of the context of the protected application running on the device with the secure store. Of course, transformations on the key make it difficult to use outside of the white box context, i.e., an attacker cannot use a transformed key with their own encryption routines.

In the preceding description, for purposes of explanation, numerous details are set forth in order to provide a thorough understanding of the embodiments of the invention. However, it will be apparent to one skilled in the art that these specific details are not required in order to practice the invention.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

In particular, it should be appreciated that the source code can be developed on one computing apparatus, while the build time processes are executed by another apparatus, while protected application is actually executed on yet another. Each apparatus can comprise a processor, memory and a machine readable medium tangibly storing machine readable and executable instructions, which when executed by a processor, cause said processor to implement the methods disclosed herein.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of transforming a binary software application comprising binary application code from an original form to a secured form, the method comprising:

applying a plurality of transformations to original binary application code during a build phase to produce transformed binary application code, wherein the plurality of transformations are applied at a plurality of application layers and wherein the transformed binary application code is not semantically equivalent to the original binary application code; and packaging the transformed binary application code with a plurality of inverse transformation keys and a plurality of inverse transformations to generate a protected application, wherein each of the plurality of inverse transformation keys is configured to provide access to a corresponding inverse transformation in the plurality of inverse transformations during an execution phase;

wherein execution of the protected application results in each of the plurality of inverse transformations being applied to a corresponding section of the transformed binary application code prior to execution of the corresponding section of the transformed binary application code, such that execution of the protected application is semantically equivalent to execution of the binary application code.

2. The method of claim 1, wherein the plurality of application layers comprise successively nested layers of the original binary application code.

3. The method of claim 2, wherein the plurality of inverse transformations must be applied to the transformed binary application code in a predetermined sequence in order for the protected application to be executable.

4. The method of claim 3, wherein the plurality of transformations are applied to the plurality of application layers in the original binary application code in a first sequence and wherein the plurality of inverse transformations must be applied to the transformed binary application code in a second sequence which is opposite the first sequence in order for the protected application to be executable.

5. The method of claim 4, wherein a first transformation in the plurality of transformations produces an output that is used as input for a second transformation in the plurality of transformations.

6. The method of claim 5 wherein each transformation in the plurality of transformations causes one or more changes to the original binary application code and each corresponding inverse transformation in the plurality of inverse transformations causes one or more additional changes to the transformed binary application code that reverse the effect of the one or more changes, wherein changes include one or more of binary code modification, binary code insertion, and binary code deletion.

7. The method of claim 6, wherein the successively nested layers comprise an application layer comprising one or more modules, a module layer comprising one or more functions, a function layer comprising one or more blocks of instructions, and an instruction layer comprising the individual machine instructions.

8. The method of any one of claims 7, further comprising:

applying at least one intra-layer transmutation to at least one layer in the plurality of application layers of one or more of the original application binary application code and the transformed application binary code.

9. The method of claim 8 wherein the at least one intra-layer transmutation includes an anti-debug transmutation applied to the at least one layer and an integrity verification transmutation applied to the original binary application code and the transformed binary application code, wherein successful execution of the protected application depends on an outcome of an integrity check added by the integrity verification transmutation.

10. The method of claim 2, wherein original binary application code is generated from source code which has been transformed by one or more source code transformations, wherein one or more of the plurality of transformations applied to the original binary application code reverse the effect of the one or more source code transformations.

11. The method of claim 1, wherein one or more of the plurality of the transformations applied to the original binary application code are applied using one or more white-box build-time keys and wherein one or more of the plurality of inverse transformation keys include one or more white-box run-time keys corresponding to the white-box build-time keys.

12. The method of claim 11, wherein each white-box build-time key is mated to a corresponding white-box run-time key and wherein both keys are generated based on original key data and a transformation algorithm selection supplied by a user.

13. The method of claim 9 wherein applying at least one intra-layer transmutation comprises:
   generating and assembling integrity verification specific white-box transformation keys and operation codes;
   computing static integrity verification voucher data that represents hashing information of the original application binary code at build-time;
   applying an integrity verification specific white-box transformation to transform said voucher data by using said specific white-box transformation keys and operation codes to prevent un-authorized access and attacks to the voucher data; and
   assembling hidden white box transformation run-time key data corresponding to said specific white-box transformation keys and operation codes;
   while an integrity verification library is invoked, interacting with the white-box transformation run-time facility to inverse-transform the white-box transformed integrity verification data to the plain integrity verification data by executing the integrity verification specific white box transformation inverse operation on white box transformation run-time key data and loading the plain data into a protected data structure;
   computing dynamic integrity verification voucher data of the binary code loaded into memory by an OS, said dynamic integrity verification voucher data representing hashing information of the application binary code at run-time, and storing the dynamic integrity verification voucher data into a protected data structure; and
   checking the integrity of the application code to be protected by comparing said static integrity verification voucher data, which is presented in protected form, against said dynamic integrity verification voucher data.

14. The method of claim 1, wherein the plurality of transformations include an instruction transmutation configured to modify an individual instruction using a white box transformation such that the instruction must have the transform removed before execution.

15. The method of claim 13, wherein the application of the integrity verification transmutation includes checks for integrity determined by user specification of designated options by allowing users inserting integrity verification API calls into selected places of source code of the application during the build phase and subsequently automatically adding an automatic integrity verification engine to the application during the build phase which executes during the execution phase.

16. The method of claim 12, further comprising: hiding the original key data and important transformation information after the white-box run-time key is generated.

17. The method of claim 11, wherein different white-box build-time and white-box run-time keys are generated for different transformations at different layers in the plurality of application layers.

18. The method of claim 13 wherein the integrity verification transmutation checks the integrity of the original binary application code itself and also checks the integrity of the code of any other binary transmutations applied to the code.

19. The method of claim 13 wherein the integrity verification transmutation execution is interlocked to the application by invoking callback functions.

20. The method of claim 1, wherein the transformed binary application code is unexecutable.

21. The method of claim 1, wherein the transformed binary application code contains errors.

22. The method of claim 1, wherein the plurality of inverse transformations are stored in a protected security module which is part of the protected application.

23. The method of claim 1, wherein each section of transformed binary application code that is executed is removed from memory after execution.

24. A system for transforming a binary software application comprising binary application code from an original form to a secured form comprising:
   one or more processors; and
   one or more memories operatively coupled to at least one of the one or more processors and having instructions stored thereon that, when executed by at least one of the one or more processors, cause at least one of the one or more processors to:
      apply a plurality of transformations to original binary application code during a build phase to produce transformed binary application code, wherein the plurality of transformations are applied at a plurality of application layers and wherein the transformed binary application code is not semantically equivalent to the original binary application code; and
      package the transformed binary application code with a plurality of inverse transformation keys and a plurality of inverse transformations to generate a protected application, wherein each of the plurality of inverse transformation keys is configured to provide access to a corresponding inverse transformation in the plurality of inverse transformations during an execution phase;
      wherein execution of the protected application results in each of the plurality of inverse transformations being applied to a corresponding section of the transformed binary application code prior to execution of the corresponding section of the transformed binary application code, such that execution of the protected application is semantically equivalent to execution of the binary application code.

25. The system of claim 24, wherein the plurality of application layers comprise successively nested layers of the original binary application code.

26. The system of claim 25, wherein the plurality of inverse transformations must be applied to the transformed binary application code in a predetermined sequence in order for the protected application to be executable.

27. The system of claim 26, wherein a first transformation in the plurality of transformations produces an output that is used as input for a second transformation in the plurality of transformations.

28. The system of claim 25, wherein original binary application code is generated from source code which has been transformed by one or more source code transformations, wherein one or more of the plurality of transformations applied to the original binary application code reverse the effect of the one or more source code transformations.

29. The system of claim 24, wherein one or more of the plurality of the transformations applied to the original binary application code are applied using one or more white-box build-time keys and wherein one or more of the plurality of inverse transformation keys include one or more white-box run-time keys corresponding to the white-box build-time keys.

30. The system of claim 24, wherein the transformed binary application code is unexecutable.

31. At least one non-transitory computer-readable medium storing computer-readable instructions that, when executed by one or more computing devices, cause at least one of the one or more computing devices to:
  apply a plurality of transformations to original binary application code during a build phase to produce transformed binary application code, wherein the plurality of transformations are applied at a plurality of application layers and wherein the transformed binary application code is not semantically equivalent to the original binary application code; and
  package the transformed binary application code with a plurality of inverse transformation keys and a plurality of inverse transformations to generate a protected application, wherein each of the plurality of inverse transformation keys is configured to provide access to a corresponding inverse transformation in the plurality of inverse transformations during an execution phase;
  wherein execution of the protected application results in each of the plurality of inverse transformations being applied to a corresponding section of the transformed binary application code prior to execution of the corresponding section of the transformed binary application code, such that execution of the protected application is semantically equivalent to execution of the binary application code.

32. The at least one non-transitory computer-readable medium of claim 31, wherein the plurality of application layers comprise successively nested layers of the original binary application code.

33. The at least one non-transitory computer-readable medium of claim 32, wherein the plurality of inverse transformations must be applied to the transformed binary application code in a predetermined sequence in order for the protected application to be executable.

34. The at least one non-transitory computer-readable medium of claim 33, wherein a first transformation in the plurality of transformations produces an output that is used as input for a second transformation in the plurality of transformations.

35. The at least one non-transitory computer-readable medium of claim 32, wherein original binary application code is generated from source code which has been transformed by one or more source code transformations, wherein one or more of the plurality of transformations applied to the original binary application code reverse the effect of the one or more source code transformations.

36. The at least one non-transitory computer-readable medium of claim 31, wherein one or more of the plurality of the transformations applied to the original binary application code are applied using one or more white-box build-time keys and wherein one or more of the plurality of inverse transformation keys include one or more white-box run-time keys corresponding to the white-box build-time keys.

37. The at least one non-transitory computer-readable medium of claim 31, wherein the transformed binary application code is unexecutable.

\* \* \* \* \*